(12) United States Patent
Erol et al.

(10) Patent No.: US 7,236,632 B2
(45) Date of Patent: Jun. 26, 2007

(54) AUTOMATED TECHNIQUES FOR COMPARING CONTENTS OF IMAGES

(75) Inventors: Berna Erol, Burlingame, CA (US); Jonathan J. Hull, San Carlos, CA (US); Dar-Shyang Lee, Union City, CA (US)

(73) Assignee: Ricoh Company, Ltd., Tokyo (JP)

( * ) Notice: Subject to any disclaimer, the term of this patent is extended or adjusted under 35 U.S.C. 154(b) by 872 days.

(21) Appl. No.: 10/412,757

(22) Filed: Apr. 11, 2003

(65) Prior Publication Data

US 2004/0202349 A1 Oct. 14, 2004

(51) Int. Cl.
G06K 9/68 (2006.01)
(52) U.S. Cl. ...................................... 382/218; 382/305
(58) Field of Classification Search ................ 382/209, 382/217–220, 224–227, 162, 108, 168, 170, 382/305, 181, 190, 173; 707/1–6, 104.1; 358/403–404
See application file for complete search history.

(56) References Cited

U.S. PATENT DOCUMENTS

| | | | |
|---|---|---|---|
| 5,583,980 A | 12/1996 | Anderson | |
| 6,122,647 A | 9/2000 | Horowitz et al. | |
| 6,243,713 B1 | 6/2001 | Nelson et al. | |
| 6,370,498 B1 | 4/2002 | Flores et al. | |
| 6,732,915 B1 | 5/2004 | Nelson et al. | |
| 2002/0056082 A1 | 5/2002 | Gage et al. | |
| 2002/0120939 A1 | 8/2002 | Well et al. | |
| 2002/0191013 A1 | 12/2002 | Abrams | |
| 2003/0009342 A1 | 1/2003 | Haley | |
| 2005/0041872 A1 | 2/2005 | Yim et al. | |
| 2005/0084154 A1* | 4/2005 | Li et al. | 382/190 |
| 2006/0285772 A1* | 12/2006 | Hull et al. | 382/305 |

FOREIGN PATENT DOCUMENTS

| | | |
|---|---|---|
| EP | 0 459 793 A1 | 12/1991 |
| WO | WO 99/50736 A1 | 10/1999 |
| WO | WO 00/52596 A2 | 9/2000 |

OTHER PUBLICATIONS

Peng et al., Document image template matching based on component block list, Pttern recognition Letter 22, Elsevier Science B.V PII: S 0167-8655 (01) 00049-6, pp. 1033-1042.*

Stricker et al., Similarity of Color Images, Communication Technology Laboratory Swiss Federal Institute of Technology, ETH ch-8092 Zurich Switzerland, pp. 1-12.*

Stifelman, "The Audio Notebook: Paper and Pen Interaction with Structured Speech;" Sep. 1997; Ph.D Thesis; Massachusetts Institute of Technology.

(Continued)

Primary Examiner—Ishrat Sherali
(74) Attorney, Agent, or Firm—Townsend & Townsend & Crew LLP

(57) ABSTRACT

Automated techniques for comparing contents of images. For a given image (referred to as an "input image"), a set of images (referred to as "a set of candidate images") are processed to determine if the set of candidate images comprises an image whose contents or portions thereof match contents included in a region of interest in the input image.

53 Claims, 12 Drawing Sheets

OTHER PUBLICATIONS

Stifelman, et al.; "The Audio Notebook: paper and pen interaction with structured speech;" *Proc. of International Conf. on Human Factors in Computing Systems* Mar. 31-Apr. 5, 2001; pp. 182-189; CHI.

Web page; "TELEform V7—Digital Beleglesung. Automatische Datenerfassung aus Formularen;" Form-Solutions; at URL=http://www.form-solutions.net/dl/Teleform.pdf>; printed Feb. 10, 2005: 5 pages.

Web page; "Xerox Office Software Suite FlowPort Version 2.1.1;" *Capture and Distribution*; at URL=http://www.xrce.xerox.com/showroom/pdf/flowport.pdf>; printed Feb. 10, 2005; 4 pages.

Won et al.; "Efficient Use of MPEG-7 Edge Histogram Descriptor;" *ETRI Journal*; Feb. 2002; pp. 23-30; vol. 24; No. 1.

Brotheron et al., "Automated Capture, Inegration, and Visualization of Multiple Media Streams," *Proceedings of IEEE Multimedia '98*, (1998).

Chiu et al., "Room with a Rear View: Meeting Capture in a Multimedia Conference Room," *IEEE Multimedia Magazine*, 7(4):48-54 (2000).

Chiu et al., "Automatically Linking Multimedia Meeting Documents by Image Matching," *Proceedings of Hypertext '00*, ACM Press, pp. 244-245 (2000).

Franklin et al., "Jabberwocky: you don∝t have to be a rocket scientist to change slides for a hydrogen combustion lecture," *Intelligent User Interfaces*, pp. 98-105 (2000).

Lee et al., "Portable Meeting Recorder," *ACM Multimedia Conference*, 2002.

Lienhart et al., "Localizing and Segmenting Text in Images, Videos and Web Pages," *IEEE Transactions On CSVT*, pp. 256-268 (2002).

Mukhopadhyay et al., "Passive capture and structuring of lectures," *ACM Multimedia*, pp. 477-487 (1999).

Muller et al., "The 'Authoring of the Fly' System for Automated Recording and Replay of (Tele)presentations," *ACM/Springer Multimedia Systems Journal*, vol. 8, No. 3 (2000).

Multi-university Research Laboratory, murl.microsoft.com; webpage printed Feb. 18, 2004.

OTSU, N., "A threshold selection method from gray-level histograms," *IEEE Transactions on Systems, Man and Cybernetics*, pp. 62-66 (1979).

Pimentel et al., "Linking by Ineracting: a Paradigm for Authoring Hypertext," *Proceedings of ACM Hypertext '2000*, May 2000.

Scansoft Capture Development System, www.scansoft.com; webpage printed Feb. 18, 2004.

Transym OCR engine, http://www.transym.com/.

Trier et al., "Goal-directed Evaluation of Binarization Methods," *IEEE Transactions on Pattern Analysis and Machine Intelligence*, pp. 1191-1201 (1995).

Waibel et al., "Advances in automatic meeting record creation and access," *Proceedings of ICASSP*, Seattle (2001).

WebEx Presentation Studio, presenter.com.

\* cited by examiner

|       | x-1 | x  | x+1 |
|-------|-----|----|-----|
| y-t/2 | -1  | -2 | -1  |
|       | 0   | 0  | 0   |

...

| y | 0 | 0 | 0 |

...

|       | 0 | 0 | 0 |
|-------|---|---|---|
| y+t/2 | 1 | 2 | 1 |

Fig. 6A

|     | x-t/2 |   |     | x |     |   | x+t/2 |
|-----|-------|---|-----|---|-----|---|-------|
| y-1 | -1    | 0 | ... | 0 | ... | 0 | 1     |
| y   | -2    | 0 | ... | 0 | ... | 0 | 2     |
| y+1 | -1    | 0 | ... | 0 | ... | 0 | 1     |

Fig. 6B

AUTOMATED TECHNIQUES FOR COMPARING CONTENTS OF IMAGES

CROSS-REFERENCES TO RELATED APPLICATIONS

The present invention incorporates by reference for all purposes the entire contents of U.S. Provisional Application No. 60/462,412 filed concurrently with the present application.

BACKGROUND OF THE INVENTION

The present invention relates to generally to the content matching techniques and more particularly to techniques for comparing contents of images to identify images that contain matching content.

Advancements in the technology and popularity of information capture devices such as digital cameras, scanners, video cameras, etc. has led to an increased amount of information being stored in the form of digital images. There is accordingly an ever increasing need for automated techniques and tools that can compare contents of digital images and find matching images. Several techniques have conventionally been developed for comparing contents of images to find matching images. However, each of these conventional techniques is tailored for images possessing specific characteristics such as image quality, resolution, blur, image segmentation characteristics, occlusions, image color, etc. Accordingly, selection of which technique to use depends heavily on characteristics of the images being compared. A specific conventional technique can be used to compare images possessing a particular characteristic but is ineffective for comparing other types of images. For example, certain conventional techniques can be used for comparing black and white images but cannot be used for comparing colored images.

In light of the above, there is a need for automated techniques that can be used to compare various different types of images possessing various different characteristics.

BRIEF SUMMARY OF THE INVENTION

Embodiments of the present invention provide automated techniques for comparing contents of images. According to an embodiment of the present invention, for a given image (referred to as an "input image"), a set of images (referred to as "a set of candidate images") are processed to determine if the set of candidate images comprises an image whose contents or portions thereof match contents included in a region of interest in the input image. The region of interest in the input image may comprise presentation information.

According to an embodiment of the present invention, techniques are provided for determining if a first set of images includes an image containing contents that match presentation information contained in a region of interest of an input image. In this embodiment, it is determined if the input image and images in the first set of images have or possess a first characteristic and a second characteristic. Based upon whether or not the input image and images in the first set of images have the first characteristic and the second characteristic, a first set of comparison techniques are identified from a plurality of comparison techniques. The contents of the input image are compared with the contents of images in the first set of images using one or more comparison techniques from the first set of comparison techniques. Based upon results of the comparison, it is determined if the first set of images includes an image comprising contents that match the presentation information in the region of interest of the input image.

According to another embodiment of the present invention, techniques are provided for determining if a plurality of images includes an image containing contents that match presentation information contained in a region of interest of an input image, the plurality of images including images captured by one or more types of capture devices. For each image in the plurality of images, a type of capture device used to capture the image is determined. The images in the plurality of images are then grouped into a plurality of sets based upon the types of capture devices used to capture the images such that all images captured by a type of capture device are grouped in one set. For each set in the plurality of sets of images: it is determined if the input image and images in the set have a first characteristic and a second characteristic; a set of comparison techniques from a plurality of comparison techniques are identified based upon whether or not the input image and the images in the set have the first characteristic and the second characteristic; contents of the input image and contents of the images in the set are compared using one or more comparison techniques from the set of comparison techniques; for each comparison technique in the one or more comparison techniques, a confidence score is received for the comparison technique and a matching image identified by the comparison technique from the set of images as containing contents that match the presentation information in the region of interest of the input image is received; a set confidence score is determined for the set based upon the confidence scores for the one or more comparison techniques; and from the matching images identified by the one or more comparison techniques, a matching image identified by the comparison technique with the highest confidence score is identified as a matching image for the set. It is determined, based upon the set confidence scores for the plurality of sets, if the plurality of images includes an image comprising contents that match the presentation information in the region of interest of the input image.

The foregoing, together with other features, embodiments, and advantages of the present invention, will become more apparent when referring to the following specification, claims, and accompanying drawings.

BRIEF DESCRIPTION OF THE DRAWINGS

FIGS. 6A and 6B depict edge operators that may be applied to an image to obtain edge magnitudes according to an embodiment of the present invention;

DETAILED DESCRIPTION OF THE INVENTION

Figure 1A:
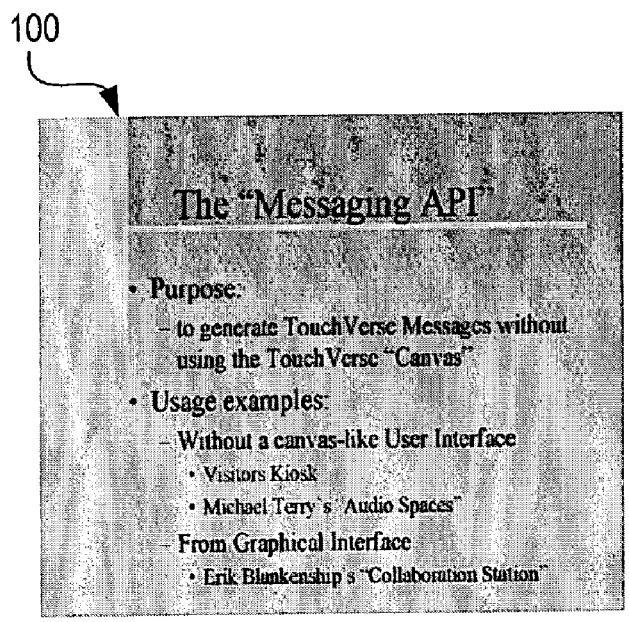
FIG. 1A depicts an input image where the region of interest occupies the entire image.

Embodiments of the present invention provide automated techniques for comparing contents of images. According to an embodiment of the present invention, for a given image (referred to as an "input image"), a set of images (referred to as "a set of candidate images") are processed to determine if the set of candidate images comprises an image whose contents or portions thereof match contents included in a region of interest in the input image. An image from the set of candidate images is considered to be a matching image to the input image if the contents contained in the region of interest in the input image are included in the matching image. The region of interest may correspond to the entire input image or a smaller portion thereof (i.e., the region of interest for the input image may cover the entire input image or a portion thereof). Accordingly, in embodiments where the region of interest covers a smaller portion of input image, the input image may contain other content in addition to the content included in the region of interest. A matching image may also contain other content in addition to the matching content included in the region of interest in the input image.

The input image and images in the set of candidate images may have been captured or generated by a variety of capture devices. Accordingly, the images may have different characteristics with respect to image quality, resolution, segmentation, color, blur, occlusions, etc. Embodiments of the present invention provide automated generalized computer-implemented techniques for comparing images that may have different characteristics and may have been captured by a variety of different capture devices.

According to an embodiment of the present invention, the region of interest of the input image that is used for the comparison corresponds to a region or portion of the input image comprising information (referred to as "presentation information") that may have been presented during a presentation. Accordingly, in this embodiment, the region of interest of the input image comprises presentation information. Examples of presentations include a meeting, a conference, a lecture, etc. The presentation information may comprise or correspond to information in a slide, a web page, charts, documents, etc. that may be displayed during a presentation or a portion thereof (i.e., a portion of a slide, a web page, charts, documents, etc). The slides or web pages, etc. may contain natural or synthetic images, photos, text or lines of text, or a combination thereof.

As described above, the images that are compared, including the input image and images in the set of candidate images, may have been captured using a variety of different capture devices. For purposes of this application, the term "capture device" is intended to refer to any device, system, apparatus, or application that is configured to capture, record, generate, or produce information, including images, of one or more types. Examples of capture devices include scanners (e.g., a scanner used to scan slides printed on paper to produce a digital representation of the slides), video recorders (e.g., video cameras, digital cameras capable of capturing video information), digital image capture devices (e.g., digital cameras, video cameras that can capture digital images, etc.), presentation recorders, screen capture devices (e.g., a whiteboard capture device), symbolic information capture devices, etc. A presentation recorder is able to capture information presented during a presentation, for example, by tapping into and capturing stream of information from an information source. For example, for a computer executing a PowerPoint presentation, a presentation recorder is able to tap into information about the presentation slides displayed by the computer. Examples of presentation recorders and information capture devices are described in U.S. Provisional Application No. 60/244,771, filed Oct. 31, 2000, U.S. application Ser. No. 09/728,560, filed Nov. 30, 2000, U.S. application Ser. No. 09/728,453, filed Nov. 30, 2000, U.S. application Ser. No. 09/521,252, filed Mar. 8, 2000, the entire contents of which are herein incorporated by reference for all purposes. Examples of presentation recorders include a screen capture software application, a PowerPoint application that allows recording of slides and time elapsed for each slide during a presentation, etc. Symbolic information capture devices can capture presentation slides by storing the presentation slides as a sequence of images (e.g., as JPEGs, BMPs, etc.) or by extracting the text content of the slides. For example, during a PowerPoint slide presentation, a symbolic information capture device may record the slides by capturing slide transitions (e.g., capturing keyboard commands) and then extracting the presentation images based on these transitions. Whiteboard capture devices may include devices such as a camera appropriately positioned to capture contents of the whiteboard, a screen, a chart, etc.

As described above, according to an embodiment of the present invention, the input image includes a region of interest that contains presentation information. The input image containing the presentation information may have been captured using any of the capture devices identified above. For example, the input image may have been captured when the presentation information is displayed or projected on a screen (e.g., a slide displayed on a screen), displayed on a computer display (e.g., a PowerPoint presentation displayed on a computer display), or displayed on some other output device, etc. For example, the input image may have been captured by an attendee at a presentation using a digital camera. The attendee may have captured the image of a PowerPoint slide displayed on a projection screen.

Figure 1B:
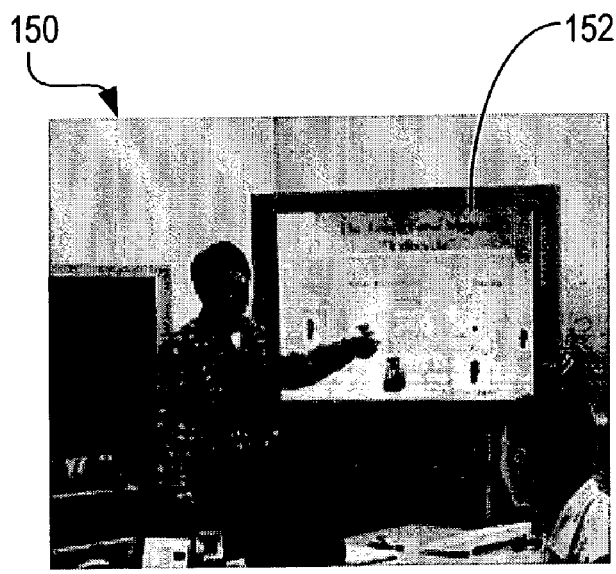
FIG. 1B depicts an input image where the region of interest occupies a portion of the input image.

As described above, the region of interest of an input image may cover the entire input image or a smaller portion thereof. FIG. 1A depicts an input image 100 where the region of interest occupies the entire image. As shown in FIG. 1A, the region of interest comprises presentation information in the form of a slide. FIG. 1B depicts an input image 150 where the region of interest occupies a portion of the input image. As depicted in FIG. 1B, region of interest 152 corresponds to a rectangular bounded portion of input image 150 that contains presentation information corresponding to a slide. Input image 150 also contains other information in addition to the presentation information included in region of interest 152. For example, the other information in image 150 includes a view of the room in which the presentation is taking place, a view of the presenter, one or more pictures of other attendees, etc.

The set of candidate images may include images captured by a variety of capture devices described above. The candidate images may or may not contain presentation information.

Figure 2:
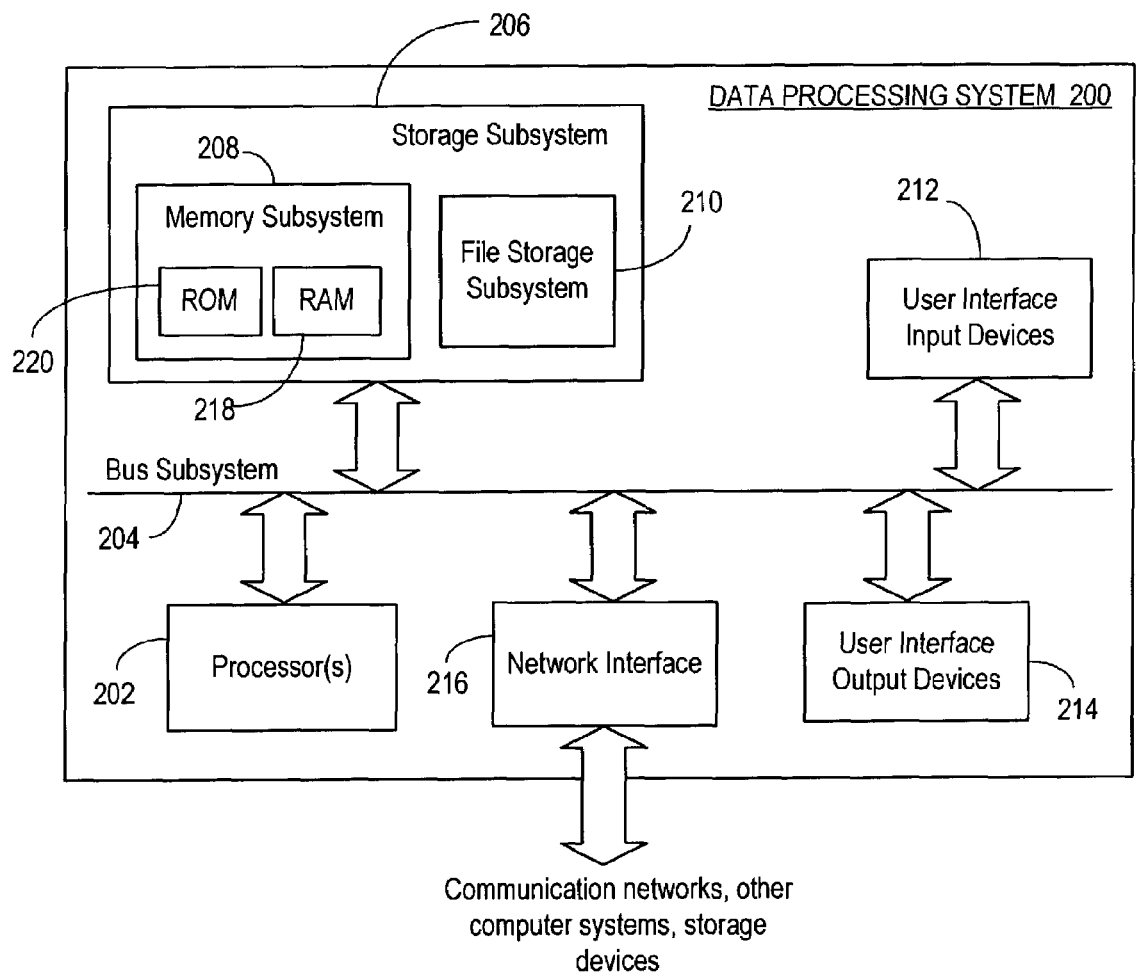
FIG. 2 is a simplified block diagram of data processing system that may incorporate an embodiment of the present invention.

FIG. 2 is a simplified block diagram of data processing system 200 that may incorporate an embodiment of the present invention. As shown in FIG. 2, data processing system 200 includes at least one processor 202, which communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216. The input and output devices allow user interaction with data processing system 202.

Network interface subsystem 216 provides an interface to other computer systems, networks, and storage resources 204. The networks may include the Internet, a local area network (LAN), a wide area network (WAN), a wireless network, an intranet, a private network, a public network, a switched network, or any other suitable communication network. Network interface subsystem 216 serves as an interface for receiving data from other sources and for transmitting data to other sources from data processing system 200. For example, may receive the images to be compared via network interface subsystem 216. Embodiments of network interface subsystem 216 include an Ethernet card, a modem (telephone, satellite, cable, ISDN, etc.), (asynchronous) digital subscriber line (DSL) units, and the like.

User interface input devices 212 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information to data processing system 200.

User interface output devices 214 may include a display subsystem, a printer, a fax machine, or non-visual displays such as audio output devices. The display subsystem may be a cathode ray tube (CRT), a flat-panel device such as a liquid crystal display (LCD), or a projection device. In general, use of the term "output device" is intended to include all possible types of devices and ways to output information from data processing system 200.

Storage subsystem 206 may be configured to store the basic programming and data constructs that provide the functionality of the present invention. For example, according to an embodiment of the present invention, software modules implementing the functionality of the present invention may be stored in storage subsystem 206. These software modules may be executed by processor(s) 202. Storage subsystem 206 may also provide a repository for storing data used in accordance with the present invention. For example, the images to be compared including the input image and the set of candidate images may be stored in storage subsystem 206. Storage subsystem 206 may comprise memory subsystem 208 and file/disk storage subsystem 210.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Bus subsystem 204 provides a mechanism for letting the various components and subsystems of data processing system 202 communicate with each other as intended. Although bus subsystem 204 is shown schematically as a single bus, alternative embodiments of the bus subsystem may utilize multiple busses.

Data processing system 200 can be of varying types including a personal computer, a portable computer, a workstation, a network computer, a mainframe, a kiosk, or any other data processing system. Due to the ever-changing nature of computers and networks, the description of data processing system 200 depicted in FIG. 2 is intended only as a specific example for purposes of illustrating the preferred embodiment of the computer system. Many other configurations having more or fewer components than the system depicted in FIG. 1 are possible.

Figure 3:
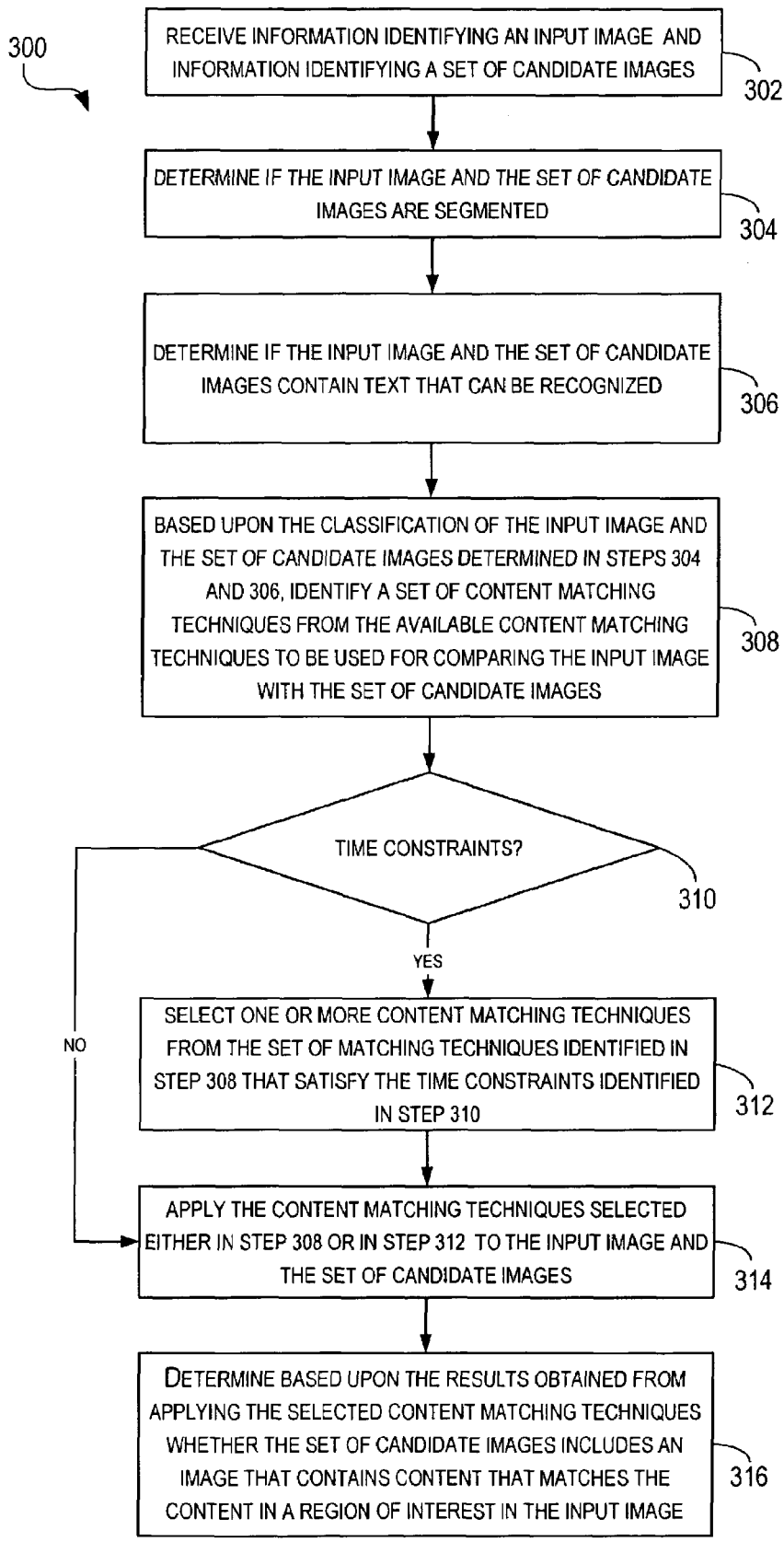
FIG. 3 depicts a simplified high-level flowchart showing a method of comparing contents of images according to an embodiment of the present invention.

FIG. 3 depicts a simplified high-level flowchart 300 depicting a method of comparing contents of images according to an embodiment of the present invention. The method may be performed by software modules executed by a data processing system, by hardware modules, or combinations thereof. Flowchart 300 depicted in FIG. 3 is merely illustrative of an embodiment incorporating the present invention and does not limit the scope of the invention as recited in the claims. One of ordinary skill in the art would recognize variations, modifications, and alternatives.

As depicted in FIG. 3, processing is initiated upon receiving information identifying an input image comprising a region of interest that comprises presentation information and information identifying a set of candidate images to be searched for identifying an image that contains presentation information that matches the presentation information in the region of interest of the input image (step 302). As previously indicated, the input image may also contain other information in addition to presentation information. The images in the set of candidate images may or may not contain presentation information. For purposes of clarity, it is assumed for the processing depicted in flowchart 300 that the set of candidate images are all captured using the same type of capture device. This is however not intended to limit the scope of the present invention. In alternative embodiments, the set of candidate images might include images captured by different capture devices.

The embodiment of the present invention then determines if the input image and the set of candidate images are segmented (step 304). In an embodiment where comparisons are made between presentation information contained in a region of interest in the input image and contents of the candidate images, an image is considered to be segmented if it contains only a region of interest comprising presentation information and no other regions. An image is considered to be non-segmented if it contains one or more regions that do not contain presentation information. A non-segmented image may or may not comprise a region comprising presentation information in addition to regions containing non-presentation information. For example, the image depicted in FIG. 1A is segmented while the image depicted in FIG. 1B is non-segmented. For example, an image captured by a symbolic capture device is likely to be a segmented image while an image captured by a digital camera is more likely to be a non-segmented image. For example, if the presentation information is considered to be a slide, some images may contain only the slide region, for example images obtained from the original source file, or images captured by a presentation recorder, and are considered segmented images. Other images may contain the slide region as well as its surroundings and are considered non-segmented. For example a digital camera picture of a presentation slide, a video clip of the presenter and the presentation slide, etc.

According to an embodiment of the present invention, information provided by a user may be used to determine if the input image and/or images in the set of candidate images are segmented or non-segmented. For example, the user may manually provide information classifying the input image and the set of candidate images as either segmented or non-segmented.

Characteristics of a capture device that is used to capture or produce an image may also be used to determine if the image is segmented or non-segmented. For example, certain capture devices are more likely to produce segmented images while other devices are more likely to produce images that are segmented. Table A provides information identifying multiple capture devices and the types (either segmented or non-segmented) of images that the devices are likely to produce.

TABLE A

| Type of capture device | Type of image likely to be produced by the capture device |
| --- | --- |
| Video recorder | Non-segmented |
| Digital Camera | Non-segmented |
| Presentation recorder/Screen capture device | Segmented |
| Symbolic information capture device | Segmented |
| Scanner | Non-segmented |

Accordingly, if the identity of the capture device is known, then that information can be used to determine if the image produced by the device is segmented or non-segmented. For example, if it is determined that the input image was produced by a digital camera then the input image is classified as a non-segmented image based on the information in Table A. The information identifying the capture devices that were used to capture the input image and the set of candidate images may be provided by the user. Alternatively, image processing techniques may be applied to the input image and the set of candidate images to determine the type of capture devices used to produce the images. The type of the capture devices may then be used to determine if the images are segmented or non-segmented.

Image processing techniques may also be applied to the input image and the set of candidate images to determine if the images are segmented or non-segmented. According to an embodiment of the present invention, image processing techniques may also be applied to convert non-segmented images into segmented images using techniques such as region-of-interest segmentation techniques that are known to those skilled in the art.

The embodiment of the present invention then determines if the input image and the set of candidate images contain text that can be recognized using optical character recognition (OCR) techniques or other text extraction techniques (step 306). An image is considered to be "OCRable" if it contains text that can be recognized using OCR techniques or text that can be extracted from the source file or image file using other text extraction techniques.

Various different techniques may be used to determine if the images are OCRable. According to an embodiment of the present invention, the user may provide information that is used to determine if the input image and/or images in the set of candidate images are OCRable. For example, the user may manually provide information classifying the input image and the set of candidate images as OCRable or not. Alternatively, information related to capture devices used to produce the images may be used to determine if the images are OCRable. For example, images from screen capture applications are more likely to be OCRable while images from a low resolution video camera are generally not OCRable. Alternatively, image processing techniques may be used to determine if the input image and the set of candidate images contain text that can be recognized using optical character recognition (OCR) techniques or other text extraction techniques. For example, an OCR technique may be applied to an image to extract text from the image. The length of the extracted text and the confidence score associated with the OCR technique and the extracted text may be used to determine whether or not the image is OCRable.

Based upon the classification of the input image and the set of candidate images determined in steps 304 and 306, a set of content matching or comparison techniques are identified from the available content matching techniques to be used for comparing the input image to images in the set of candidate images to determine if the set of candidate images includes at least one image that includes content that matches the presentation content contained in the region of interest of the input image (step 308). The available content matching techniques may include various image matching techniques and techniques that compare contents extracted from image file or source files. Several different techniques may be available such as edge histogram matching technique (referred to as "EH" technique), layout matching technique (referred to as "LM" technique), OCR-string matching technique (referred to as "OCRS" technique), line profile matching technique (referred to as "LP" technique), and several others. Descriptions of the some of the individual techniques are provided below in the section labeled "Matching Techniques". Table B identifies some of the techniques that are to be selected for matching the input image to the set of candidate images based upon the classifications of the input image and the set of candidate images.

TABLE B

| | | INPUT IMAGE | | | |
|---|---|---|---|---|---|
| | | S + O | NS + O | S + NO | NS + NO |
| SCI | S + O | EH, LM, OCRS, LP | OCRS, LP | EH, LM, LP | LP |
| | NS + O | OCRS, LP | OCRS, LP | EH, LM, LP | LP |
| | S + NO | EH, LM, LP | EH, LM, LP | EH, LM, LP | LP |
| | NS + NO | LP | LP | LP | LP | where:
SCI—set of candidate images
S—segmented
NS—non-segmented
O—OCRable
NO—Non-OCRable
EH—edge histogram matching technique
LM—layout matching technique
OCRS—OCR-string matching technique
LP—line profile matching technique Accordingly, in step 308, a set of matching techniques are selected from the available matching techniques based upon the characteristics of the input image and the set of candidate images. For example, if the input image is classified in steps 304 and 306 as non-segmented and OCRable, and the set of candidate images is classified as segmented and non-OCRable, the set of techniques selected in step 308 includes edge histogram matching technique (EH), layout matching techniques (LM), and line profile matching technique (LP) per the information in Table B.

A check is then made to see if there are any processing time constraints associated with the comparison process (step 310). Several different processing time constraints may be specified depending on the application that is performing the processing depicted in FIG. 3 and the context in which the processing is being performed. For example, the time constraints may specify if the processing is to be performed in real-time or off-line. Time constraints in the form of maximum time limits allowed for the processing may also be specified. If it is determined in step 310 that time constraints are specified for the processing, then one or more matching techniques that satisfy the time constraints are then selected from the set of matching techniques identified in step 308 (step 312). For example, the layout matching technique (LM) and the edge histogram matching techniques (EH) are more suited for real-time processing as they are faster than the OCR-string matching technique (OCRS) and line profile matching techniques (LP). Accordingly, if the comparison of the input image to the set of candidate images is to be performed in real time then the EH and LM techniques are selected over the OCRS and LP techniques. If there are no time constraints associated with the comparison then processing continues with step 314.

The matching techniques selected either in step 308 or in step 312 are then applied to the input image and the set of candidate images (step 314). According to an embodiment of the present invention, the selected techniques are applied in random order. According to another embodiment of the present invention, heuristics or control information may be specified that controls the order and manner in which the selected matching techniques are applied.

According to an embodiment of the present invention, heuristics may be specified such that, if the selected techniques (selected either in step 308 or step 312) includes the edge histogram matching technique (EH), then this technique is used first as it is fast to compute and accurate. Next, if the selected techniques include the layout matching technique (LM), then that technique is used. Even though the results of the layout matching technique (LM) may not be as accurate as the edge histogram matching technique (EH), it is very fast to compute. Next, if the selected techniques include the OCR-string matching technique (OCRS), then that technique is used. Though the OCR-string matching technique (OCRS) is slower to execute, it produces accurate results. Lastly, the line profile matching technique (LP) is used. The line profile matching technique (LP) is slow to compute and is generally the least accurate of the other techniques. The heuristics or control information described above is merely illustrative of an embodiment of the present invention and are not intended to limit the scope of the present invention as recited in the claims. Several other types of heuristics may also be defined. For example, the user may also specify the order in which the matching techniques are to be applied. Accordingly, in step 314, heuristics or control information may be applied to determine the order in which the selected matching techniques that are to be applied.

According to an embodiment of the present invention, all the selected matching techniques are applied in step 314. In alternative embodiments, all the selected matching techniques may not be applied in step 314. In one such alternative embodiment, if a satisfactory matching image is identified by application of a selected matching technique, then the other selected matching techniques need not be applied.

According to an embodiment of the present invention, when a selected matching technique is applied, distance values are computed between the input image and each image in the set of candidate images. A distance value for an input image and an image from the set of candidate images provides a measure of the closeness of the match between content contained in the region of interest of the input image and content in the image from the set of candidate images. The closeness of the match is generally proportional to the distance value. Accordingly, a smaller distance value indicates a closer match.

According to an embodiment of the present invention, the results or outputs of applying a selected matching technique to the input image and the set of candidate images in step 314 include a match confidence score (Cm), an image (Imatch) from the set of candidate images that is the best matched image to the input image (Iinput) using the selected matching technique, and the distance (MinDistance) between Imatch and the input image Iinput. As described above, the distance MinDistance provides a measure of the closeness of the match between the content (e.g., the presentation information) contained in the region of interest of the input image and the contents of the Imatch image. In certain embodiments, metadata associated with the selected matching technique may also be output. According to an embodiment of the present invention, the metadata includes information related to parameters or thresholds used by a selected matching technique. The metadata might be different for different matching techniques.

As indicated above, after applying a selected matching technique to find the best matched image in the set of candidate images to the input image, a confidence score (Cm) is computed and output for the selected matching technique. The confidence score Cm for a selected matching technique provides a measure of the level of confidence that the best matched image found by applying that selected matching technique found is indeed the image that would be identified as most similar to the input image by a human subject. According to an embodiment of the present invention, the confidence score for a selected matching technique is computed as follows. For a given input image Iinput and a set of candidate images S={$I_1, I_2, I_3, \ldots, I_k$}, a match confidence score Cm is computed as:

$$Cm = \frac{(d_{min2} - d_{min})}{d_{min} + 1}$$

where:

$d_{min}$—is the distance between input image Iinput and the best matched image Imatch in S, $$d_{min} = \min_{Ik \in S}\{d(Iinput, I_k)\};$$

$d_{min2}$—is the distance between input image Iinput and the best matched image Imatch in S, $$d_{min2} = \min_{Ik \in \{S - Imatch\}}\{d(Iinput, I_k)\}.$$

Based upon the results obtained from applying the selected matching techniques, a determination is then made whether the set of candidate images includes an image that contains content that matches the content in the region of interest of the input image (step 316). The image identified to be the matching image may contain other content in addition to the matching content in the region of interest of the input image. According to an embodiment of the present invention, the determination in step 316 is based on the matching confidence scores Cm output by the selected matching techniques. According to another embodiment, the determination in step 316 is based on the matching confidence scores Cm and the distance MinDistance output by the selected matching techniques. According to yet another embodiment of the present invention, the determination in step 316 is based on the matching confidence scores Cm, the distance MinDistance output, and the metadata output by selected matching techniques. In other embodiments, other criteria may also be used to identify the matching image.

For example, according to an embodiment of the present invention in which all the techniques selected in steps 308 or 312 are applied to the input image and the set of candidate images, the Imatch image output by the matching technique with the highest confidence score may be selected as the matching image. According to another embodiment of the present invention, the Imatch image output by the matching technique with the highest confidence score may be selected as the matching image if the highest confidence score satisfies a user-configurable threshold (referred to as a "match threshold"). In other embodiments, the MinDistance and metadata obtained from applying the selected matching technique with the highest confidence score may also be compared to one or more match thresholds to determine if the Imatch output by the matching technique is considered a matching image. The match thresholds are user-configurable, thus allowing the user to control how closely the contents of an image in the set of candidate images have to match the contents in the region of interest of the input image for the image in the set of candidate images to be considered a matching image. An Imatch image for a matching technique may be identified as a matching image if the match thresholds are satisfied. If none of the candidate images satisfy the match thresholds then the user may be notified that the set of candidate images does not contain any images whose contents match the contents in the region of interest of the input image.

In embodiments where the selected techniques are applied according to a particular order (e.g., a particular order determined from heuristics), the results obtained from a first applied selected technique may be used to determine if a matching image has been located. According to an embodiment of the present invention, the Imatch image output by the first applied selected matching technique may be considered a match if the match confidence score (Cm) for the first technique satisfies a match threshold. In other embodiments, the Imatch image output by the first matching technique may be considered a match if the match confidence score (Cm) for the first technique and the MinDistance output by the first applied matching technique satisfy one or more match thresholds. In yet other embodiments of the present invention, the Imatch image output by the first applied matching technique may be considered a match if the match confidence score (Cm) for the first technique, the MinDistance, and the metadata output by the first applied technique satisfy one or more match thresholds. If the results output from applying the first applied matching technique are deemed to satisfy the match thresholds, then the Imatch image output by the technique is identified as the matching image. Information identifying the Imatch image may then be output to the user and processing ends. If however, the results output from applying the first applied matching technique are deemed not to satisfy the match thresholds, then a second selected matching technique (based upon the ordering) is applied and results obtained from applying the second technique are analyzed to find a matching image. In this manner, the other selected matching techniques may be applied in order until a matching image is identified or until the results from applying the selected techniques indicate that none of the images in the set of candidate images match the input image.

As described above, the segmentation and OCRable characteristics of the input image and images in the set of candidate images were used to determine a set of matching techniques to be used for comparing the contents of the images. In alternative embodiments of the present invention other characteristics (e.g., color, image quality, resolution, occlusions, blur, etc.) of the images may also be used to identify a set of matching techniques from the available matching techniques to be used for comparing the images.

Figure 4:
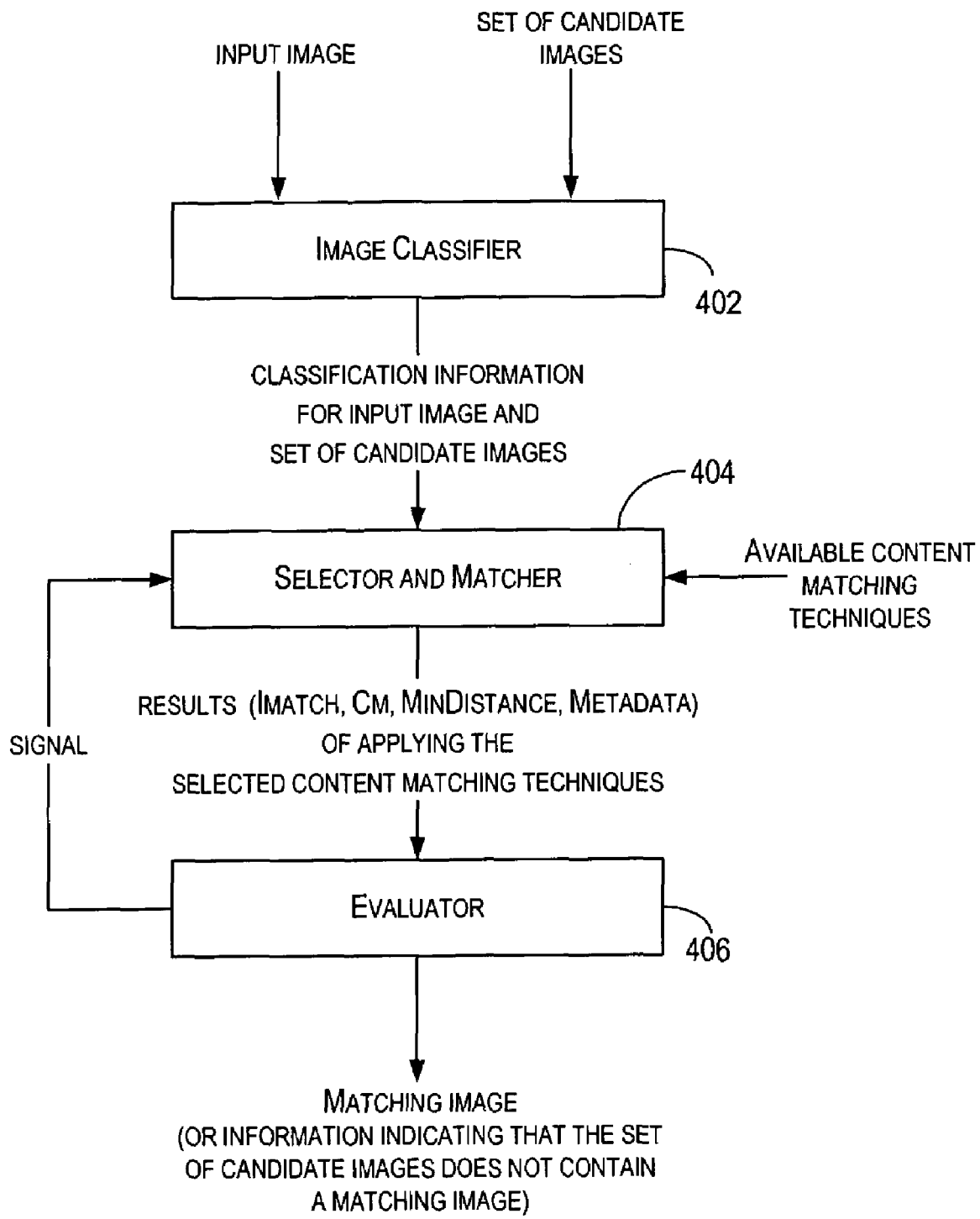
FIG. 4 is a simplified block diagram of modules that may perform the processing depicted in FIG. 3 according to an embodiment of the present invention.

FIG. 4 is a simplified block diagram of modules that may perform the processing depicted in FIG. 3 according to an embodiment of the present invention. The modules depicted in FIG. 4 may be software modules executed by a data processor, hardware modules, or combinations thereof. The modules depicted are merely illustrative of an embodiment of the present invention and do not limit the scope of the invention as recited in the claims. One of ordinary skill in the art would recognize variations, modifications, and alternatives.

As depicted in FIG. 4, the modules include an image classifier module 402, a selector and matcher module 404, and an evaluator module 406. Classifier module 402 receives as input the input image (Iinput) and a set of candidate images (S) to be searched. Classifier module 402 is configured to classify the input image and the set of candidate images as either segmented or non-segmented, and OCRable or non-OCRable. Other classifications may also be made in alternative embodiments of the present invention. Information identifying the classification of the images is then provided to selector and matcher module 404. Accordingly, classifier module 402 performs the processing depicted in steps 302, 304, and 306 in flowchart 300 depicted in FIG. 3.

Selector and matcher module 404 is configured to receive classification information related to the input image and the set of candidate images from image classifier module 402 and to select a set of matching techniques from the available matching techniques to be applied for the input image and set of candidate images. Selector and matcher module 404 may use information such as information described in Table B (previously described) to select a set of matching techniques to be applied. Selector and matcher module 404 may also be configured to determine if there are any time constraints associated with the processing and to select an appropriate set of matching techniques that satisfy the time constraints.

Selector and matcher module 404 is then configured to apply the selected matching techniques to the input image and the set of candidate images. As described above, the selected matching techniques may be applied in various ways. If heuristics are specified for determining the order in which the selected matching techniques are to be applied, then selector and matcher module 404 is configured to evaluate the heuristics and determine an order for applying the selected matching techniques. Selector and matcher module 404 is configured to provide the results obtained from applying the selected matching techniques to evaluator module 406. As described above, the results obtained from applying a selected matching technique may include a match confidence score (Cm) for the selected matching technique, an image (Imatch) from the set of candidate images that is the best matched image using the selected matching technique, the distance (MinDistance) between Imatch and the input image indicating the closeness of the match, and metadata associated with the selected matching technique. Accordingly, selector and matcher module 404 is configured to perform processing described in steps 308, 310, 312, and 314 of flowchart 300 depicted in FIG. 3.

Evaluator module 406 is configured to receive results from selector and matcher module 404 and to determine if the set of candidate images includes an image whose contents match content in the region of interest of the input image. As described above, the determination whether the set of candidate images contains a matching image may depend on the confidence score (Cm) for a selected matching technique, the MinDistance measure output by the technique, and metadata if any output from the technique. In order to determine if a match is found, evaluator module 406 may compare the results to match thresholds. If a matching image is found, then evaluator module 406 is configured to output information identifying the matching image. The confidence score (Cm) associated with the technique that identified the matching image may also be output. Evaluator module 406 may also compute a final confidence score (Cf) for the matching image and output the final confidence score (Cf). According to an embodiment of the present invention, the final confidence score (Cf) is based upon the confidence scores (Cm) of the selected matching techniques and computed by summing all the Cm values for the selected matching techniques and dividing the resultant sum by the number of Cm values. If no matching image is found, then evaluator module 406 may output information indicating that no matching image was found.

In embodiments of the present invention where the selected techniques are to be applied in a particular order (e.g., a particular order determined from heuristics), evaluator module 406 is configured to receive results from selector and matcher module 402 obtained from applying a first selected technique. If a matching image is determined based upon those results, then information identifying the matching image may be output by evaluator module 406 along with the confidence score (Cm) for the first matching technique. If a matching image is not identified based upon results obtained from applying the first selected matching technique, evaluator module 406 may be configured to send a signal to selector and matcher module 404 signaling that the selector and matcher module 404 to apply the next selected technique in order. Evaluator module 406 may then receive and evaluate results obtained from applying the next selected matching technique to see if a matching image is found. In this manner, evaluator module 406 may send a signal to selector and matcher module 404 until a matching image is found or until all the selected matching techniques have been applied by selector and matcher module 404. Accordingly, evaluator module 406 is configured to perform processing depicted in step 316 in FIG. 3.

Figure 5:
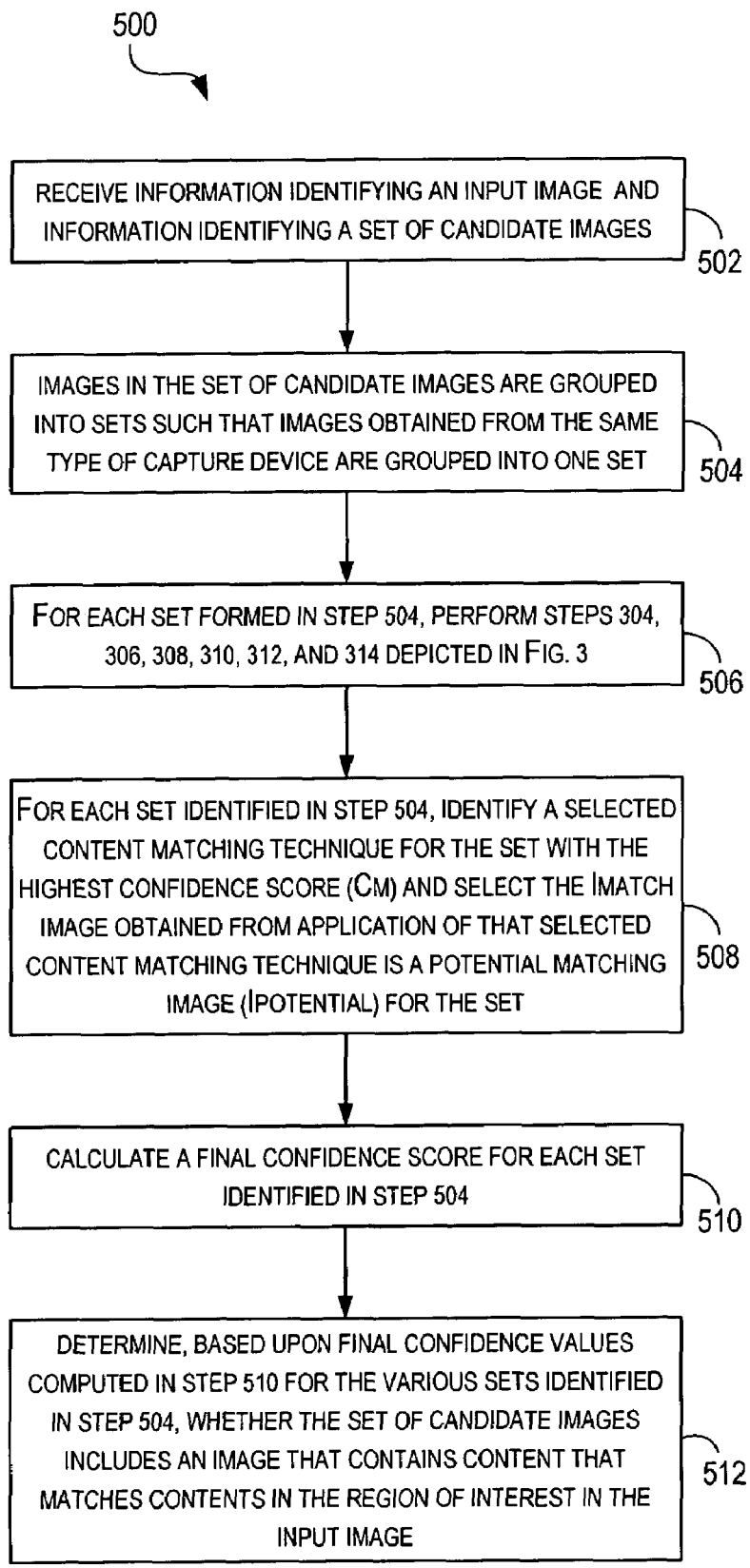
FIG. 5 depicts a simplified high-level flowchart 500 depicting a method of comparing images according to an embodiment of the present invention wherein the set of candidate images may contain images obtained from different types of capture devices or sources.

For the processing depicted in FIG. 3 it was assumed that the set of candidate images are all captured using the same type of capture device or source. This is however not intended to limit the scope of the present invention. FIG. 5 depicts a simplified high-level flowchart 500 depicting a method of comparing images according to an embodiment of the present invention wherein the set of candidate images may contain images obtained from different capture devices or sources. The method may be performed by software modules executed by a data processing system, by hardware modules, or combinations thereof. Flowchart 500 depicted in FIG. 5 is merely illustrative of an embodiment incorporating the present invention and does not limit the scope of the invention as recited in the claims. One of ordinary skill in the art would recognize variations, modifications, and alternatives.

As depicted in FIG. 5, processing is initiated upon receiving information identifying an input image that comprises presentation information and information identifying a set of candidate images to be searched for identifying an image that contains presentation information that matches the presentation information in the region of interest of the input image (step 402). The input image may also contain other information in addition to presentation information. The set of candidate images can include images captured by different capture devices.

The images in the set of candidate images are then grouped into sets such that images obtained from the same type of capture device are grouped into one set (step 504). For example, all images captured using a digital camera may be grouped in one set, all images captured using a scanner may be grouped into another set, and so on. The processing in step 504 may be performed based upon information received from the user. For example, for each image in the set of candidate images, the user may provide information identifying the capture device used for capturing or producing the image. This information may then be used to group the candidate images into sets such that each set generated in step 504 includes images captured or obtained from the same type of capture device. In alternate embodiments, images in the set of candidate images may be analyzed using image processing techniques to determine the type of capture device used for capturing the images, and the information obtained from the image may be used to group the candidate images into sets in step 504.

Processing described in steps 304, 306, 308, 310, 312, and 314 is performed for each set generated in step 504 (step 506). Accordingly, in step 506, for each set identified in step 504, the selected matching techniques are applied to the input image and images in that set.

For each set identified in step 504, a selected matching technique with the highest confidence score (Cm) for that set is identified and the Imatch image obtained from application of that selected matching technique is then selected as a potential matching image (Ipotential) for that set (step 508). A final confidence score (Cf) is calculated for each set identified in step 504 (step 510). According to an embodiment of the present invention, the final confidence score (Cf) for a set is computed by summing all the Cm values obtained for the set by applying the selected matching techniques and dividing the resultant sum by the number of Cm values.

It is then determined, based upon Cf values computed in step 510 for various sets identified in step 504, whether the set of candidate images includes an image that contains contents that match the contents (e.g., presentation information) in the region of interest of the input image (step 512). According to an embodiment of the present invention, the Ipotential image associated with the set having the highest final confidence value (Cf) is identified as the matching image (i.e., an image that contains content that matches the content of interest in the input image). According to another embodiment of the present invention, the highest final confidence value (Cf) value may be compared to match thresholds to determine if the Ipotential image associated with that set is the matching image. Metadata associated with the matching technique for the set may also be used to determine if the image is a match. The final confidence value and the metadata may be compared to match thresholds and a match is indicated only if the match thresholds are satisfied. In this manner a matching image may be found from the set of candidate images that may include images captured by or obtained from a variety of different capture devices.

Application Examples

This section describes simple examples of processing performed for identifying a matching image for an input image according to embodiments of the present invention. These examples are merely illustrative of embodiments of the present invention and are not meant to limit the scope of the present invention as recited in the claims.

(1) Matching Images Obtained by from a Presentation Recorder with Images Obtained from a Symbolic Information Capture Device In this example, the input image is obtained from a presentation recorder and the set of candidate images are obtained from a symbolic information capture device (or alternatively, the set of candidate images is obtained from a presentation recorder and the input image is obtained from a symbolic information capture device). Generally, images obtained from a presentation recorder and a symbolic information capture device are segmented images (as indicated in Table A). It is further assumed that the images are OCRable and the processing is to be performed in real-time. Based upon these conditions, the edge histogram matching technique (EH) and layout matching technique (LM) are selected per Table B. It is further assumed that heuristics are defined such that the edge histogram matching technique (EH) is to be applied before the layout matching technique (LM). Pseudo code for the matching process is given below.

```
//Parameters of edge and layout match routines, edgeMatch and layoutMatch:
//Inputs:
//    Iinput : Input image to be matched
//    S: set of candidate images
//Outputs:
```

-continued

```
//    Cm: match confidence value
//    Imatch: best matched image for edge histogram matching technique
//    (EH)
//    MinDistance: the distance of Iinput to Imatch.
//Edge histogram matching technique (EH) is performed first
edgeMatch (Iinput, S, &Cm, &Imatch, &MinDistance);
// Match Thresholds: Th1, Th2, and Th3
//If confidence value for the match is larger than Th1, minimum distance
is below Th2, and number of all edges (metadata) detected in Iinput is
larger than Th3, then Imatch is declared as the matching image to Iinput.
if(Cm> Th1 && MinDistance<Th2 && NofEdges(I)>Th3)
        Match[Iinput]=Imatch;
else
    //If a matching image is not found using edge histogram matching
    technique (EH)
    // then layout matching technique (LM) is performed
    // Imatch2: Imatch for layout matching technique (LM)
    layoutMatch (Iinput, S, &Cm, &Imatch2, &MinDistance);
    if (Imatch2==Imatch && Cm> Th1 / 5) //The match thresholds are
    loosened
        Match[Iinput]=Imatch;
    else
        if (Cm> Th1 && MinDistance< Th2)
            Match[Iinput]=Imatch;
```

As indicated above, the match thresholds (Th1, Th2, Th3) may be configured by a user. According to an embodiment of the present invention, Th1 is set to 1.0. Suggested values for Th2 and Th3 according to an embodiment of the present invention: Th2=100; Th3=100.

(2) Matching Images Obtained from a Scanner to Images Obtained from a Presentation Recorder or a Symbolic Information Capture Device In this example, the input image is obtained from a scanner and the set of candidate images are obtained from a presentation recorder or a symbolic information capture device (or alternatively, the set of candidate images is obtained from a scanner and the input image is obtained from a symbolic information capture device or a presentation recorder). Generally, images obtained from a scanner are non-segmented. Nevertheless, segmenting the region of interest from such images can easily be done via post processing sousing a segmentation technique. These images are generally OCRable. It is further assumed that the processing is to be performed in real-time. Based upon these conditions, the OCR-string matching technique (OCRS) and edge histogram matching technique (EH) are selected. It is further assumed that heuristics are defined such that the OCR-string matching technique (OCRS) is to be applied before applying the edge histogram matching technique (EH). This is because since the images are not segmented at the time of the capture and the post-segmentation process may be erroneous, edge histogram matching technique (EH) may not yield as accurate results. OCR-string matching technique (OCRS) is performed first and the edge histogram matching technique (EH) is applied only if OCR-string matching technique (OCRS) fails to find a matching image. In order to apply edge histogram matching technique (EH), the image may need to be segmented. Pseudo code for the matching process is given below.

```
//Parameters of edge and layout match routines, OCRSMatch and
edgeMatch
//Inputs:
//    Iinput : Input image to be matched
//    S: set of candidate images
//Outputs:
```

-continued

```
//    Cm: match confidence value
//    Imatch: best matched image for edge histogram matching technique
          (EH)
//    MinDistance: the distance of Iinput to Imatch.
//First perform OCR-string matching.
OCRMatch (Iinput, S, &Cm, &Imatch, &MinDistance);
// Match thresholds: Th1, Th2, Th4
// If confidence value for the match is larger than Th1, minimum distance
is below Th2,
// and a sufficient number of characters are extracted from the image
(>Th4), declare Imatch as the
// matching image to Iinput.
if (Cm> Th1 && MinDistance< Th2 && StringLength(I)>Th4)
        Match[Iinput]=Imatch;
else
        Segment (Iinput); //Segment the input image
        //perform edge matching
        edgeMatch (Iinput, S, &Cm, &Imatch2, &MinDistance);
        if (Imatch2==Imatch && Cm> Th1 / 5)      //Thresholds
        loosened
                Match[Iinput]=Imatch;
        else
            if (Cm> Th1 && MinDistance< Th2)
                Match[Iinput]=Imatch;
```

As indicated above, the match thresholds (Th1, Th2, Th4) may be configured by a user. According to an embodiment of the present invention, Th1 is set to 1.0. Suggested values for Th2 and Th4 according to an embodiment of the present invention: Th2=100; Th4=20.

(3) Matching Images Obtained Using a Video Recorder or Digital Camera with Images Obtained Using a Video Recorder, Digital Camera, Presentation Recorder, or Symbolic Information Capture Device In this example, the input image is obtained using a video recorder or digital camera and the set of candidate images are obtained from a video recorder, digital camera, presentation recorder, or symbolic information capture device (or alternatively, the set of candidate images is obtained from a video recorder or digital camera and the input image is obtained from a video recorder, digital camera, presentation recorder, or symbolic information capture device). It is assumed that the images are OCRable.

Images obtained from video recorder or digital camera are generally non-segmented images and also may posses skew, motion blur, etc. characteristics that may make accurate use of edge histogram matching technique (EH) and layout matching technique (LM) difficult. Accordingly, OCR-string matching technique (OCRS) and line profile matching technique (LP) techniques are used. In some cases OCR-string matching technique (OCRS) may also not yield satisfactory results. For example, if StringLength(Iinput)<Th4 (where Th4 is some user defined threshold, and StringLength is the number of characters extracted from an image), then line profile matching technique (LP) is used. The Th4 threshold may be defined as part of the heuristics to determine which matching technique to use. Alternatively, the Th4 threshold may be defined as part of the match thresholds. Pseudo code for the matching process is given below:

```
//Parameters of OCR and edge match routines, OCRMatch and
LineProfileMatch:
//Inputs:
//   Iinput: Input image to be matched
//   S: set of candidate images
//Outputs:
//   Cm: match confidence value
//   Imatch: best matched image
//   MinDistance: the distance of Iinput to Imatch
//The OCR-string matching technique is performed first.
OCRMatch (Iinput, S, &Cm, &Imatch, &MinDistance);
// Match thresholds: Th1, Th2, Th4
// If confidence value for the match is larger than Th1, minimum distance
is below Th2, and a sufficient number
// of characters are extracted from the image (>Th4), declare Imatch as
the matching image to Iinput.
if (Cm> Th1 && MinDistance< Th2 && StringLength(I)>Th4)
        Match[Iinput]=Imatch;
else
        //perform line profile matching
        LineProfileMatch (Iinput, S, &Cm, &Imatch2, &MinDistance);
        if (Imatch2==Imatch && Cm> Th1 / 5) //Thresholds are
        loosened
                Match[Iinput]=Imatch;
        else
            if (Cm> Th1 && MinDistance< Th2)
                Match[Iinput]=Imatch;
```

As indicated above, the match thresholds (Th1, Th2, Th4) may be configured by a user. According to an embodiment of the present invention, Th1 is set to 1.0. Suggested values for Th2 and Th4 according to an embodiment of the present invention: Th2=100; Th4=20.

EXAMPLE OF MATCHING TECHNIQUES

This section provides a general description of some image matching techniques that may be used by the present invention.

(1) Edge Histogram Matching (EH)

Histograms are commonly used in the art to represent features of an image, Edges in images constitute an important feature to represent the contents of the images. An edge histogram feature vector represents the local, global, and/or semi-global edge content and/or edge distribution in an image. Edges can be of many types, including diagonal, vertical and horizontal. An edge histogram distance between two images is computed by finding the distance between their corresponding edge histogram feature vectors. These distances can be found in a variety of ways, including using the sum of absolute differences or sum of squared differences. The distance between an input image, Iinput, and each of the images in the set {S} of candidate images, can be computed based on edge histogram differences. The image in {S} that has the minimum distance to Iinput is declared to be the matching image, Imatch. The distance of Imatch to Iinput is called MinDistance. A match confidence score, Cm, may also be computed (an example of such a computation is described above). Metadata may also be output by the edge histogram matching technique. For example, the metadata may include the "number of edges" in an Iinput image.

According to an embodiment of the present invention, a modified edge histogram matching technique is used as follows. The following description assumes that the technique is used on an image of a slide. Text regions in images contain strong horizontal and vertical edges. Local horizontal and vertical edge histograms of a slide image are employed to effectively represent the amount of text and text layout in an image.

Edge histograms are extracted as follows according to an embodiment of the present invention. First, edge detection operators (e.g., a Sobel operator) as shown in FIGS. 6A and 6B may be applied to an image to obtain edge magnitudes.

A parameter "t" may be used for edge detection. The parameter "t" is an estimation of how wide the edges of characters are in a slide image. That is, if an object with a foreground color is placed on a background color, at the edges, most of the time, the transition between the foreground and background is not sharp. There might be pixels at the edge that do not have exactly background color or the foreground color, but have a color in between these. Most of the times these pixels are introduced by low pass filtering of the capture device. According to an embodiment of the present invention, the value t=4 is used. It is important to note that the performance of edge matching does not have a strong dependency on "t", as long as all edges are extracted using the same "t" value.

After edge magnitudes are computed for an image, an edge is detected only if the edge magnitude is larger than a threshold and either edge direction has changed or the location of the current pixel is far enough (>t) from the previous edge pixel. Pseudo code for the vertical edge detector is given below. Horizontal edges are found in a similar way.

```
t=4 // t is an estimation of how wide the edges of characters in a slide image
sign=0 //sign of the current edge
oldSign=0 //sign of the previous edge
PreviousX =0 // the location of the last edge
Th=50 //The threshold value to declare a pixel as an edge pixel
for (y= t; y<imageHeight; y++)
    Px=0;
    for (x= t; x<imageWidth; x++)
    {
        //compute horizontal Sobel edge with some distance factor t
        edgeVal= 2*lum[y*w+(x-t/2)]-2*lum[y*w+(x+t/2)]+
            lum[(y-1)*w+(x-t/2)]-lum[(y-1)*w+(x+t/2)]+
            lum[(y+1)*w+(x-t/2)]-lum[(y+1)*w+(x+t/2)];
        //find the sign of the current edge value
        sign=edgeVal<0 ? -1:1;
        //if (magnitude of an edge if larger than a threshold) and (the
edge changed direction or the location of the current pixel is far
enough from the previous edge pixel) declare an edge
        if ((abs(edgeVal)>Th) && (sign!=oldSign ||(x-PreviousX)>t))
        {
            verticalEdge [x][y]=1;
            PreviousX=x;
        }
        oldSign=sign;
    }
}
```

After horizontal and vertical edge pixels are extracted, the image is divided into N×M segments and the number of horizontal and vertical edge pixels are computed separately for each segment to form the local horizontal, $H_{hor}$, and vertical, $H_{ver}$, edge histograms and normalized by the total number of pixels in their corresponding segments as follows.

$$H_{ver}(n, m) = \frac{1}{S_M S_N} \sum_{y=mS_M}^{(m+1)S_M} \sum_{x=nS_N}^{(n+1)S_N} verticalEdge[x][y]$$

where N is the number of horizontal segments and M is the number of vertical segments, verticalEdge[x][y] is the detected edge value at (x,y) location, $S_N$ and $S_M$ are the height and width of segment (n,m) in pixels and found by $S_N$=ImageWidth/N and $S_M$=ImageHeight/M. Horizontal edge histogram, $H_{hor}$, is found in a similar way.

The resulting feature vector includes N×M vertical edge histogram bins and N×M horizontal edge histogram bins. Two global edge features are also included in the feature vector, which are computed by summing the histogram values of vertical and horizontal edge histograms separately and normalizing them by N×M as follows.

$$G_{ver} = \frac{1}{MN} \sum_{m=0}^{M} \sum_{n=0}^{N} H_{ver}(n, m)$$

The resulting feature vector is $\vec{F} = [G_{hor}, G_{ver}, H_{hor}(0,0), \ldots, H_{hor}(n,m), H_{ver}(0,0), \ldots, H_{ver}(n,m)]$.

Since the processing does not use a low pass filtering (such as a Gaussian filtering commonly used in Canny edge detection scheme), the edges in natural images and textures are likely to contribute greatly to the edge histograms. This is desired since they help accurate matching of slides containing images as well as text. If the presentation slide background is textured (for example edge histograms having consistently high value for each histogram bin and each slide), a smoothing filter may be used to suppress the background texture prior to edge detection.

The distance between the edge histogram feature vectors, $\vec{F}_1$ and $\vec{F}_2$ can be found by computing the L2 norm of their difference, which is the sum of squared differences of each vector value.

(2) Layout Matching

The layout of an image represents roughly how the color and intensity of pixels are distributed in an image. Generally, each color channel of the image is spatially down-sampled with an averaging filter to compute the layout of an image. If an image is grayscale or black and white, then only luminance channel may be considered. The distance between two image layouts is found by summing the absolute differences between each corresponding layout location of each color channel. The distance between an input image, Iinput, and each image in the set of candidate images {S} can be computed based on these layout differences. The image in {S} that has the minimum distance to Iinput is declared to be the matching image, Imatch. The distance of Imatch to Iinput is called MinDistance. A match confidence score, Cm, may also be computed (an example of such a computation is described above). Metadata may also be output by the layout matching technique.

There could be cases where an image of a presentation slide does not contain any text or edges. In such cases the distance between two images can be found by layout distance. According to an embodiment, each color channel of the slide image is down-sampled with an averaging filter and the sum computed of absolute differences to find the layout distance between two images.

Generally, the slide region of an image needs to be segmented prior to computing the layout distance. Accordingly, this technique is used for segmented images. If the image contains only the slide regions, for example, the images captured by the presentation recorder, then segmentation is not needed.

(3) OCR-String Matching

The similarity of two images can be computed based on their text content. The text content of an image can be obtained by using Optical Character Recognition (OCR). OCR is well known in the literature and commercial packages exist that perform OCR on images. If a slide image (i.e., image containing slide presentation information) is obtained from a known source, for example from a PowerPoint file or an HTML page, it is also possible to extract text from that file by decoding the syntax of the PowerPoint file or the HTML page. Once the text is extracted, the distance between an input image, Iinput, and each of the images in the set of candidate images {S} can be computed based on the edit distances between the extracted texts. The image in {S} that has the minimum distance to Iinput is declared to be the matching image, Imatch. The distance of Imatch to Iinput is called MinDistance. A match confidence score, Cm, may also be computed as explained above. Metadata may also be output by the OCR-string matching technique. For example, the metadata may include the number of characters that are extracted from the image ("string length").

This explanation assumes that the content of interest comprises presentation information, namely, presentation slides. Presentation slides generally contain text with oversized fonts in a color contrasting to their background. Nevertheless, text extraction from the images of such slides can still be challenging, because of the different lighting conditions and occlusions that may occur during the capture, as well as blur, tilt or other effects that might be introduced by the capture device. Many researchers have addressed the problem of segmenting text in varying luminance conditions and from textured backgrounds (e.g., as described in R. Lienhart and A. Wernicke, "Localizing and Segmenting Text in Images, Videos and Web Pages", IEEE Transactions on CSVT, pp. 256–268, 2002, the entire contents of which are incorporated herein by reference). Once the text is segmented and binarized, commercial OCR packages such as ScanSoft (Scansoft Capture Development System developed by ScanSoft, Inc. located in Massachusetts, U.S.) and Transym (Transym OCR engine developed by Transym Computer Services Limited) can be used to extract text.

The processing comprises two steps: (a) binarization followed by (b) computation of the string distance.

(a) Binarization

Various global and local thresholding methods suggested for segmenting and binarizing text in color images are described in (1) O. D. Trier and A. Jain, "Goal-Directed Evaluation of Binarization Methods", IEEE Transactions on Pattern Analysis and Machine Intelligence, pp. 1191–1201, 1995, (2) N. Otsu "A threshold selection method from gray-level histograms", IEEE Transactions on Systems, Man and Cybernetics, pp. 62–66, 1979, and (3) R. Lienhart and A. Wernicke, "Localizing and Segmenting Text in Images, Videos and Web Pages", IEEE Transactions on CSVT, pp. 256–268, 2002, whose contents are incorporated herein by reference.

Global thresholding techniques, such as the well-known Otsu's method are not suitable because of lighting variations that are likely to occur within an image. Moreover, a captured image may contain objects, such as people, that are outside of the region or content of interest (i.e., the slide area), which might affect the selection of an appropriate global threshold. Therefore, a local adaptive binarization method is used. Trier et al. evaluated a number of local binarization techniques and concluded that Nilback's method performs best for OCR purposes. Nilback's method is based on computing a local threshold for each pixel based on the mean and standard deviation of local neighborhood. The formulation for threshold selection includes a constant typically based on the amount and size of the text in an image to obtain the best performance. This is an acceptable assumption to make when binarizing documents that are scanned at a certain resolution containing fonts in a limited range. However, such assumptions are not proper for the image matching process as the resolution and font size can differ dramatically from one image to the other. In such scenarios, Nilback's method produces binary images that have inconsistent quality. According to an embodiment of the present invention, a localized version of Otsu's method is used for binarization as it does not require any constants or training for threshold selection. Otsu's method selects an optimum threshold that minimizes the within class variances based on two cluster assumption.

Figure 7A:
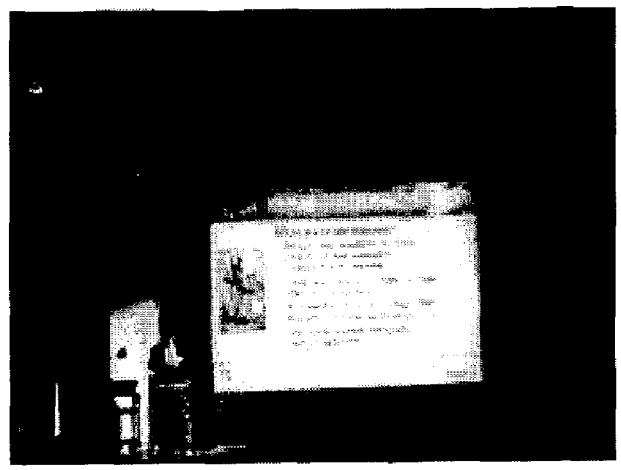
FIG. 7A depicts an image.
Figure 7B:
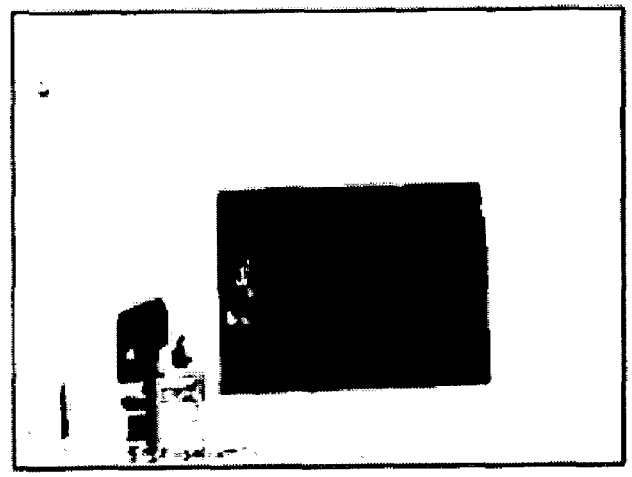
FIG. 7B depicts binarization results obtained from applying Otsu global thresholding technique to the image depicted in FIG. 7A.
Figure 7C:
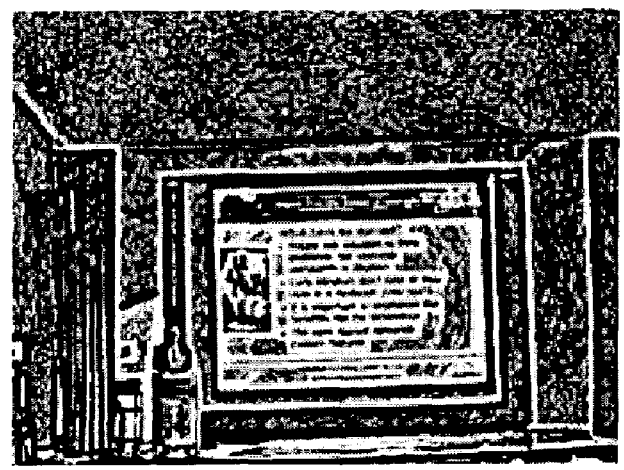
FIG. 7C depicts binarization results obtained from applying Nilback's local thresholding technique to the image depicted in FIG. 7A.
Figure 7D:
FIG. 7D depicts binarization results obtained from applying a modified technique to the image depicted in FIG. 7A according to an embodiment of the present invention.
Figure 8A:
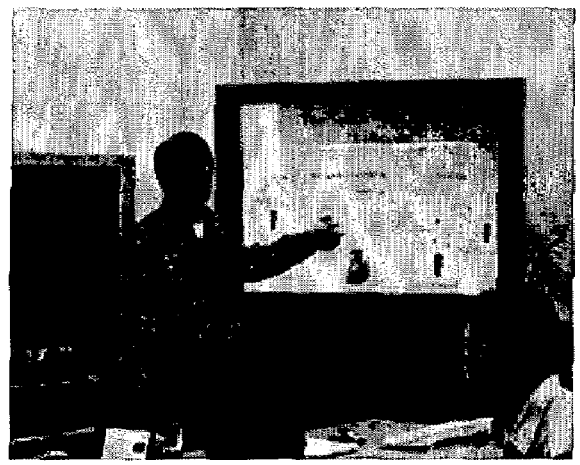
FIG. 8A depicts an image.
Figure 8B:
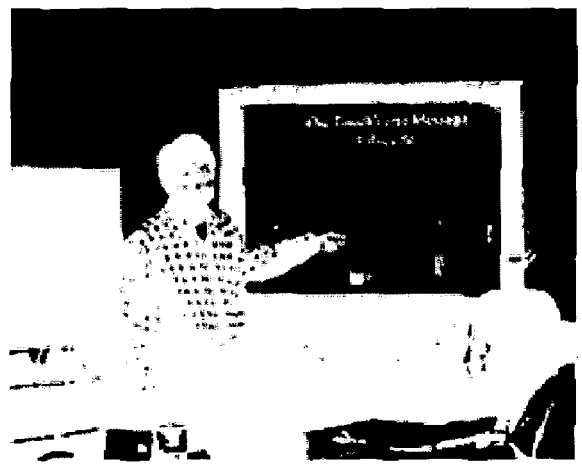
FIG. 8B depicts binarization results obtained from applying Otsu global thresholding technique to the image depicted in FIG. 8A.
Figure 8C:
FIG. 8C depicts binarization results obtained from applying Nilback's local thresholding technique to the image depicted in FIG. 8A.
Figure 8D:
FIG. 8D depicts binarization results obtained from applying a modified technique to the image depicted in FIG. 8A according to an embodiment of the present invention.

As part of the binarization process, a high boost filter is first applied to the image to improve the contrast between the background and the text. Next, for each pixel location, mean and variance of the local neighborhood of size 16×16 pixels is computed. Regions containing text generally have high variances. If a pixel has a very low variance neighborhood, it is classified as a background pixel. Otherwise, Otsu's clustering technique is applied to the 16×16 region around the pixel to select a threshold and classify the pixel accordingly. FIGS. 7B, 7C, 7D, and FIGS. 8B, 8C, and 8D show the results of the binarization of two example slide shots depicted in FIGS. 7A and 8A. FIGS. 7A and 8A show the original images, FIGS. 7B and 8B show the binarization results with Otsu global thresholding, FIGS. 7C and 8C show the binarization results with Nilback's local thresholding, and FIGS. 7D and 8D show the binarization results according to the modified technique according to an embodiment of the present invention that involves pre-filtering followed by Otsu local thresholding of high variance neighborhoods. As seen from the FIGS. 7B, 7C, 7D, 8B, 8C, and 8D, the modified method according to an embodiment of the present invention achieves better binarization of text and yields better OCR results.

Text extraction from pictures of slides can have some other useful applications as well. For example, based on the analysis of the OCR output, a list of topics that a person is interested in can be automatically compiled. A list of other relevant topics and presentations can be retrieved automatically based on a person's interests.

(b) String Distance Computation:

After the images are binarized, skew is corrected, and OCR is performed, string matching is performed using the text output to find a similarity score between two slide images. OCR results from slide images captured by different devices can be in different accuracy. For example, the text output extracted from a digital camera image is generally less accurate than that obtained by OCR'ing the screen projection output. In most of the applications that we foresee slide matching being useful, one of the capture sources is likely to be more reliable than the other and the OCR results obtained from one of the sources will likely to be close to the ground truth. This is taken into consideration when performing string matching and the string that is obtained from the more reliable source is classified as the ground truth string. The characters obtained for each slide are first concatenated. Then the similarity score between two strings are computed as follows.

$$d_s = (l_g - d_e)/l_g,$$

where $l_g$ is the length of ground truth string and $d_e$ is the edit distance between two strings. Edit distance is computed by counting the number of inserts and deletions required for matching. The punctuations and the extra characters in the string that is extracted from the less reliable source are ignored.

(4) Line Profile Matching

A line profile represents the quantity, distribution, and the length of text lines in an image. The distance between an input image, Iinput, and each image in the set of candidate images {S} can be computed based on the distance computed between two line profiles. The image in {S} that has the minimum distance to Iinput is declared to be the matching image, Imatch. The distance of Imatch to Iinput is called MinDistance. A match confidence score, Cm, may also be computed as explained above. Metadata may also be output by the line profile matching technique. For example, the metadata may include the length of the longest line in the image.

The following explanation of using this technique assumes that the content on interest to be compared includes a slide region. If an image is blurred character recognition from such an image is very difficult. Further, employing layout or edge histogram matching for this image requires having an accurately segmented slide region which may not be available. Such images can be compared using line profile matching techniques. Description of a modified line profiling technique is provided below according to an embodiment of the present invention.

According to the modified line profile matching technique, the text regions in the images are first identified. Text regions generally have strong vertical edges and a vertical edge detection method (as described above in the edge histogram matching technique description) is used. Edges are computed in each color space, e.g., R, G, B, and Luminance. An edge pixel is detected if an edge pixel is identified in any of the color spaces. For each pixel location, a value, $E_{xy}$, is computed by accumulating the number of edge pixels in a neighborhood window KxL. The pixels that have $E_{xy}$ values that are larger than an adaptive threshold are marked as pixels that belong to a text region. Then for each horizontal line in the image (if there are broken lines they can be connected), the maximum run of such pixels are computed to obtain a line profile. This is illustrated in FIGS. 10A, 10B, 10C, 10A, 10B, and 10C.

Figure 9A:
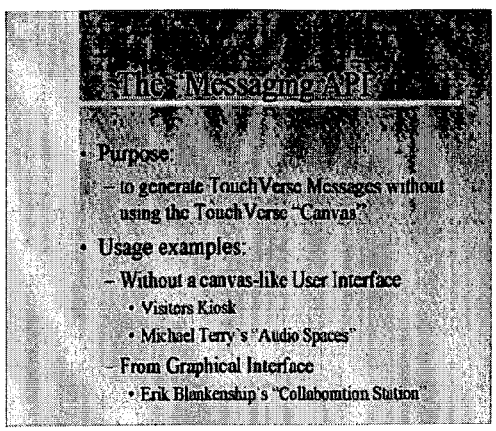
FIG. 9A depicts an image comprising presentation information.
Figure 9B:
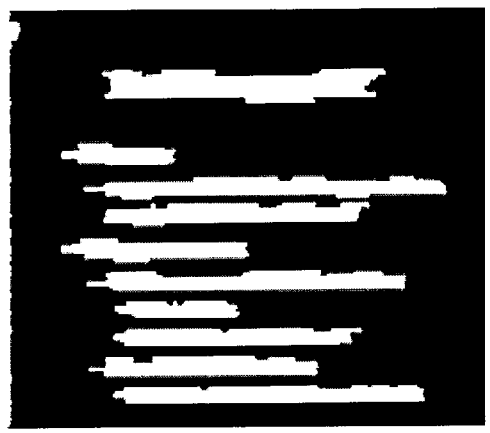
FIG. 9B depicts regions of the image depicted in FIG. 9A that potentially contain text.
Figure 9C:
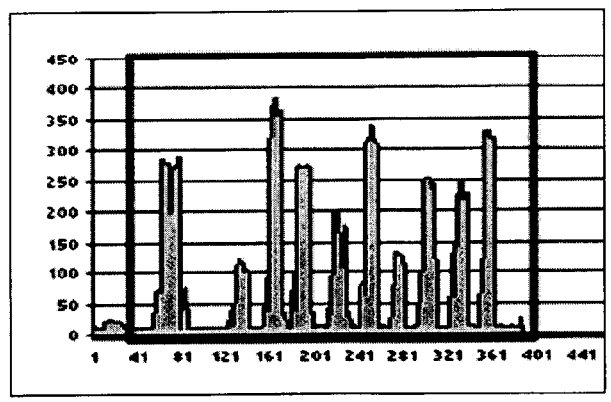
FIG. 9C depicts a graph showing runs projected onto the vertical axes for the regions depicted in FIG. 9B.
Figure 10A:
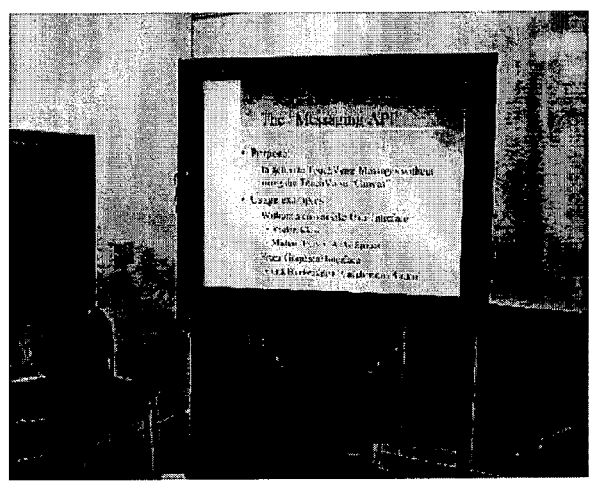
FIG. 10A depicts an image comprising presentation information.
Figure 10B:
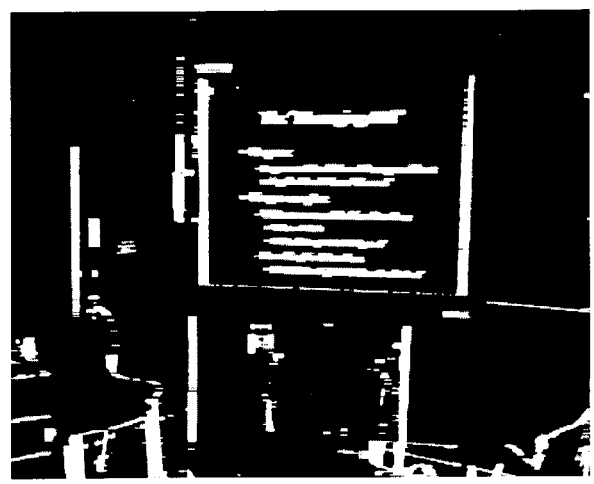
FIG. 10B depicts regions of the image depicted in FIG. 10A that potentially contain text.
Figure 10C:
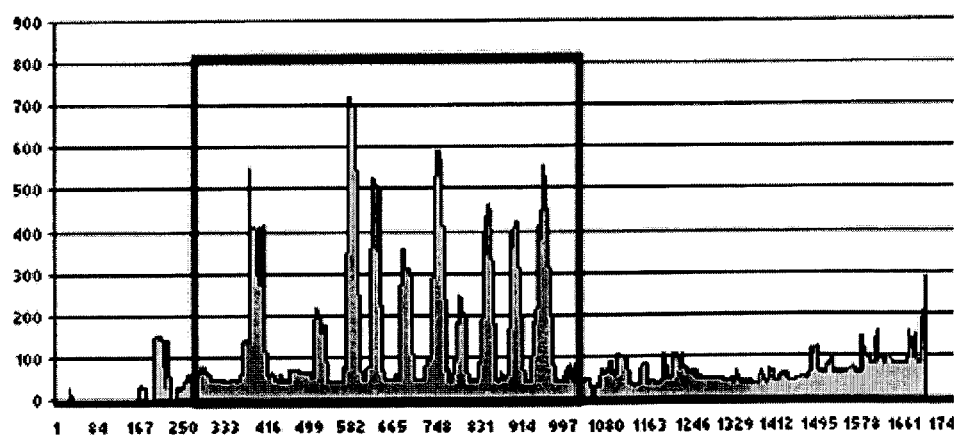
FIG. 10C depicts a graph showing runs projected onto the vertical axes for the regions depicted in FIG. 10B.

FIGS. 9A and 10A depict images comprising presentation information. FIGS. 9B and 10B show regions of images depicted in FIGS. 9A and 10A that potentially contain text. FIGS. 9C and 10C depict graphs showing runs (maximum number of consecutive text region pixels) projected onto the vertical axes for the regions depicted in FIGS. 9B and 10B. The X axis on each graph is the image height and the Y axis is the maximum number of consecutive text region pixels. The peaks in the line profile (FIGS. 10C and 10C) correspond to the text lines in the image. For matching line profiles of two images that can be of different resolutions, these values are first normalized. The normalization is done by finding the peak value in the line profile (which is proportional to the longest text line in the image) and then scaling both the x and y values of the line profile with this peak value. This provides normalization in both horizontal and vertical directions. Then a feature vector is formed by the normalized line profile values.

The feature vectors of the different images may be in different sizes. The distance between two feature vectors is found by aligning the two vectors with their peak value and computing the sum of absolute differences.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments.

Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A computer-implemented method of determining if a first set of images includes an image containing contents that match presentation information contained in a region of interest of an input image, the method comprising:

determining if the input image and images in the first set of images have a first characteristic;

determining if the input image and the images in the first set of images have a second characteristic;

identifying a first set of comparison techniques from a plurality of comparison techniques based upon whether or not the input image and images in the first set of images have the first characteristic and the second characteristic;

comparing contents of the input image and contents of images in the first set of images using one or more comparison techniques from the first set of comparison techniques; and determining, based upon results of the comparison, if the first set of images includes an image comprising contents that match the presentation information in the region of interest of the input image.

2. The method of claim 1 wherein the region of interest corresponds to a portion of the input image.

3. The method of claim 1 wherein:

determining if the input image and the images in the first set of images have the first characteristic comprises determining if the input image and the images in the first set of images are segmented; and determining if the input image and the images in the first set of images have the second characteristic comprises determining if the input image and the images in the first set of images comprise text that can be recognized.

4. The method of claim 3 wherein determining if the input image and the images in the first set of images are segmented comprises receiving information indicating whether the input image and images in the set of candidate images are segmented.

5. The method of claim 3 wherein determining if the input image and the images in the first set of images are segmented comprises:

identifying one or more capture devices used to capture the input image and the images in the first set of images; and determining, based upon the one or more capture devices, whether the input image and images in the first set of images are segmented.

6. The method of claim 5 further comprising:
   storing information identifying a plurality of capture devices; and
   storing, for each capture device in the plurality of capture devices, information indicating if an image captured by the capture device is segmented.

7. The method of claim 3 wherein determining if the input image and the images in the first set of images are segmented comprises:
   processing the input image and the images in the first set of images to determine whether the input image and the images in the first set of images are segmented.

8. The method of claim 3 wherein determining if the input image and the images in the first set of images comprise text that can be recognized comprises receiving information indicative of whether the input image and the images in the first set of images comprise text that can be recognized.

9. The method of claim 3 wherein determining if the input image and the images in the first set of images comprise text that can be recognized comprises:
   identifying one or more capture devices used to capture the input image and the images in the first set of images; and
   determining, based upon the one or more capture devices, whether the input image and the images in the first set of images comprise text that can be recognized.

10. The method of claim 3 wherein determining if the input image and the images in the first set of images comprise text that can be recognized comprises processing the input image and the images in the first set of images to determine whether the input image and the images in the set of candidate images comprise text that can be recognized.

11. The method of claim 3 further comprising:
    storing first information identifying one or more comparison techniques from the plurality of comparison techniques to be selected based upon whether or not the input image and the images in the first set of images have the first characteristic and the second characteristic.

12. The method of claim 11 wherein identifying the first set of comparison techniques from the plurality of comparison techniques comprises:
    using the first information to determine if a comparison technique from the plurality of comparison techniques is included in the first set of comparison techniques.

13. The method of claim 3 further comprising:
    receiving information identifying a time constraint; and
    identifying a second set of comparison techniques from the first set of comparison techniques that satisfy the time constraint;
    wherein comparing the contents of the input image and the contents of the images in the first set of images using the one or more comparison techniques from the first set of comparison techniques comprises using comparison techniques included in the second set of comparison techniques.

14. The method of claim 3 wherein comparing the contents of the input image and the contents of images in the first set of images using one or more comparison techniques from the first set of comparison techniques comprises:
    determining an order in which comparison techniques in the first set of comparison techniques are to be applied; and
    applying the one or more comparison techniques from the first set of comparison techniques in the determined order.

15. The method of claim 3 wherein determining if the first set of images includes an image comprising contents that match the presentation information in the region of interest of the input image comprises:
    receiving, for each comparison technique in the one or more techniques from the first set of comparison techniques, a confidence score for the comparison technique and a matching image identified by the comparison technique from the first set of images as containing contents that match the presentation information in the region of interest of the input image; and
    identifying, based upon the confidence scores for the one or more comparison techniques, an image, from the matching images identified by the one or more comparison techniques, as the image comprising contents that match the presentation information in the region of interest of the input image.

16. The method of claim 15 wherein the image from the matching images identified as comprising contents that match the presentation information in the region of interest of the input image is a matching image identified by a comparison technique with the highest confidence score.

17. The method of claim 3 wherein determining if the first set of images includes an image comprising contents that match the presentation information in the region of interest of the input image comprises:
    receiving, for each comparison technique in the one or more techniques from the first set of comparison techniques,
        a confidence score for the comparison technique,
        a matching image identified by the comparison technique from the first set of images as containing contents that match the presentation information in the region of interest of the input image, and
        a distance value for each image in the first set of images, the distance value indicative of a measure of closeness of match between the presentation information contained in the region of interest of the input image and contents in the image from the first set of images; and
    identifying, based upon the confidence scores for the one or more comparison techniques and the distance values, an image, from the matching images identified by the one or more comparison techniques, as the image comprising contents that match the presentation information in the region of interest of the input image.

18. A computer-implemented method of determining if a plurality of images includes an image containing contents that match presentation information contained in a region of interest of an input image, the plurality of images including images captured by one or more types of capture devices, the method comprising:
    determining, for each image in the plurality of images, a type of capture device used to capture the image;
    grouping the images in the plurality of images into a plurality of sets based upon the types of capture devices used to capture the images such that all images captured by a type of capture device are grouped in one set;
    for each set in the plurality of sets of images,
        determining if the input image and images in the set have a first characteristic,
        determining if the input image and the images in the set have a second characteristic,
        identifying a set of comparison techniques from a plurality of comparison techniques based upon whether or not the input image and the images in the set have the first characteristic and the second characteristic, comparing contents of the input image and contents of the images in the set using one or more comparison techniques from the set of comparison techniques, receiving, for each comparison technique in the one or more comparison techniques, a confidence score for the comparison technique and a matching image identified by the comparison technique from the set of images as containing contents that match the presentation information in the region of interest of the input image, determining a set confidence score for the set based upon the confidence scores for the one or more comparison techniques, and determining, from the matching images identified by the one or more comparison techniques, a matching image identified by the comparison technique with the highest confidence score as a matching image for the set; and determining, based upon the set confidence scores for the plurality of sets, if the plurality of images includes an image comprising contents that match the presentation information in the region of interest of the input image.

19. The method of claim 18 wherein determining if the plurality of images includes an image comprising contents that match the presentation information in the region of interest of the input image comprises:

identifying the matching image for the set with the highest set confidence score as an image comprising contents that match the presentation information in the region of interest of the input image.

20. The method of claim 18 wherein:

determining if the input image and images in the set have the first characteristic comprises determining if the input image and the images in the set are segmented; and determining if the input image and the images in the set have a second characteristic comprises determining if the input image and the images in the set comprise text that can be recognized.

21. A data processing system for determining if a first set of images includes an image containing contents that match presentation information contained in a region of interest of an input image, the data processing system comprising:

a processor;

a memory coupled to the processor, the memory configured to store a plurality of code modules for execution by the processor, the plurality of code modules comprising:

a code module for determining if the input image and images in the first set of images have a first characteristic;

a code module for determining if the input image and the images in the first set of images have a second characteristic;

a code module for identifying a first set of comparison techniques from a plurality of comparison techniques based upon whether or not the input image and images in the first set of images have the first characteristic and the second characteristic;

a code module for comparing contents of the input image and contents of images in the first set of images using one or more comparison techniques from the first set of comparison techniques; and a code module for determining, based upon results of the comparison, if the first set of images includes an image comprising contents that match the presentation information in the region of interest of the input image.

22. The system of claim 21 wherein the region of interest corresponds to a portion of the input image.

23. The system of claim 21 wherein:

the code module for determining if the input image and the images in the first set of images have the first characteristic comprises a code module for determining if the input image and the images in the first set of images are segmented; and the code module for determining if the input image and the images in the first set of images have the second characteristic comprises a code module for determining if the input image and the images in the first set of images comprise text that can be recognized.

24. The system of claim 23 wherein the code module for determining if the input image and the images in the first set of images are segmented comprises a code module for receiving information indicating whether the input image and images in the set of candidate images are segmented.

25. The system of claim 23 wherein the code module for determining if the input image and the images in the first set of images are segmented comprises:

a code module for identifying one or more capture devices used to capture the input image and the images in the first set of images; and a code module for determining, based upon the one or more capture devices, whether the input image and images in the first set of images are segmented.

26. The system of claim 25 wherein the memory is configured to store information identifying a plurality of capture devices, and for each capture device in the plurality of capture devices, information indicating if an image captured by the capture device is segmented.

27. The system of claim 23 wherein the code module for determining if the input image and the images in the first set of images are segmented comprises:

a code module for processing the input image and the images in the first set of images to determine whether the input image and the images in the first set of images are segmented.

28. The system of claim 23 wherein the code module for determining if the input image and the images in the first set of images comprise text that can be recognized comprises a code module for receiving information indicative of whether the input image and the images in the first set of images comprise text that can be recognized.

29. The system of claim 23 wherein the code module for determining if the input image and the images in the first set of images comprise text that can be recognized comprises:

a code module for identifying one or more capture devices used to capture the input image and the images in the first set of images; and a code module for determining, based upon the one or more capture devices, whether the input image and the images in the first set of images comprise text that can be recognized.

30. The system of claim 23 wherein the code module for determining if the input image and the images in the first set of images comprise text that can be recognized comprises a code module for processing the input image and the images in the first set of images to determine whether the input image and the images in the set of candidate images comprise text that can be recognized.

31. The system of claim 23 wherein the memory is configured to store first information identifying one or more comparison techniques from the plurality of comparison techniques to be selected based upon whether or not the input image and the images in the first set of images have the first characteristic and the second characteristic.

32. The system of claim 31 wherein the code module for identifying the first set of comparison techniques from the plurality of comparison techniques comprises:
   a code module for using the first information to determine if a comparison technique from the plurality of comparison techniques is included in the first set of comparison techniques.

33. The system of claim 23 wherein the plurality of code modules further comprises:
   a code module for receiving information identifying a time constraint; and
   a code module for identifying a second set of comparison techniques from the first set of comparison techniques that satisfy the time constraint;
   wherein the code module for comparing the contents of the input image and the contents of the images in the first set of images using the one or more comparison techniques from the first set of comparison techniques comprises a code module for using comparison techniques included in the second set of comparison techniques.

34. The system of claim 23 wherein the code module for comparing the contents of the input image and the contents of images in the first set of images using one or more comparison techniques from the first set of comparison techniques comprises:
   a code module for determining an order in which comparison techniques in the first set of comparison techniques are to be applied; and
   a code module for applying the one or more comparison techniques from the first set of comparison techniques in the determined order.

35. The system of claim 23 wherein the code module for determining if the first set of images includes an image comprising contents that match the presentation information in the region of interest of the input image comprises:
   a code module for receiving, for each comparison technique in the one or more techniques from the first set of comparison techniques, a confidence score for the comparison technique and a matching image identified by the comparison technique from the first set of images as containing contents that match the presentation information in the region of interest of the input image; and
   a code module for identifying, based upon the confidence scores for the one or more comparison techniques, an image, from the matching images identified by the one or more comparison techniques, as the image comprising contents that match the presentation information in the region of interest of the input image.

36. The system of claim 35 wherein the image from the matching images identified as comprising contents that match the presentation information in the region of interest of the input image is a matching image identified by a comparison technique with the highest confidence score.

37. The system of claim 23 wherein the code module for determining if the first set of images includes an image comprising contents that match the presentation information in the region of interest of the input image comprises:
   a code module for receiving, for each comparison technique in the one or more techniques from the first set of comparison techniques,
      a confidence score for the comparison technique,
      a matching image identified by the comparison technique from the first set of images as containing contents that match the presentation information in the region of interest of the input image, and
      a distance value for each image in the first set of images, the distance value indicative of a measure of closeness of match between the presentation information contained in the region of interest of the input image and contents in the image from the first set of images; and
   a code module for identifying, based upon the confidence scores for the one or more comparison techniques and the distance values, an image, from the matching images identified by the one or more comparison techniques, as the image comprising contents that match the presentation information in the region of interest of the input image.

38. A computer system for determining if a plurality of images includes an image containing contents that match presentation information contained in a region of interest of an input image, the plurality of images including images captured by one or more types of capture devices, the computer system comprising:
   a processor;
   a memory coupled to the processor, the memory configured to store a plurality of code modules for execution by the processor, the plurality of code modules comprising:
      a code module for determining, for each image in the plurality of images, a type of capture device used to capture the image;
      a code module for grouping the images in the plurality of images into a plurality of sets based upon the types of capture devices used to capture the images such that all images captured by a type of capture device are grouped in one set;
      for each set in the plurality of sets of images,
         a code module for determining if the input image and images in the set have a first characteristic,
         a code module for determining if the input image and the images in the set have a second characteristic,
         a code module for identifying a set of comparison techniques from a plurality of comparison techniques based upon whether or not the input image and the images in the set have the first characteristic and the second characteristic,
         a code module for comparing contents of the input image and contents of the images in the set using one or more comparison techniques from the set of comparison techniques,
         a code module for receiving, for each comparison technique in the one or more comparison techniques, a confidence score for the comparison technique and a matching image identified by the comparison technique from the set of images as containing contents that match the presentation information in the region of interest of the input image,
         a code module for determining a set confidence score for the set based upon the confidence scores for the one or more comparison techniques, and
         a code module for determining, from the matching images identified by the one or more comparison techniques, a matching image identified by the comparison technique with the highest confidence score as a matching image for the set; and a code module for determining, based upon the set confidence scores for the plurality of sets, if the plurality of images includes an image comprising contents that match the presentation information in the region of interest of the input image.

39. The system of claim 38 wherein the code module for determining if the plurality of images includes an image comprising contents that match the presentation information in the region of interest of the input image comprises:

a code module for identifying the matching image for the set with the highest set confidence score as an image comprising contents that match the presentation information in the region of interest of the input image.

40. The system of claim 38 wherein:

the code module for determining if the input image and images in the set have the first characteristic comprises a code module for determining if the input image and the images in the set are segmented; and the code module for determining if the input image and the images in the set have a second characteristic comprises a code module for determining if the input image and the images in the set comprise text that can be recognized.

41. A computer program product stored on a computer-readable medium for determining if a first set of images includes an image containing contents that match presentation information contained in a region of interest of an input image, the computer program product comprising:

code for determining if the input image and images in the first set of images have a first characteristic;

code for determining if the input image and the images in the first set of images have a second characteristic;

code for identifying a first set of comparison techniques from a plurality of comparison techniques based upon whether or not the input image and images in the first set of images have the first characteristic and the second characteristic;

code for comparing contents of the input image and contents of images in the first set of images using one or more comparison techniques from the first set of comparison techniques; and code for determining, based upon results of the comparison, if the first set of images includes an image comprising contents that match the presentation information in the region of interest of the input image.

42. The computer program product of claim 41 wherein the region of interest corresponds to a portion of the input image.

43. The computer program product of claim 41 wherein:

the code for determining if the input image and the images in the first set of images have the first characteristic comprises code for determining if the input image and the images in the first set of images are segmented; and the code for determining if the input image and the images in the first set of images have the second characteristic comprises code for determining if the input image and the images in the first set of images comprise text that can be recognized.

44. The computer program product of claim 43 further comprising:

code for storing first information identifying one or more comparison techniques from the plurality of comparison techniques to be selected based upon whether or not the input image and the images in the first set of images have the first characteristic and the second characteristic.

45. The computer program product of claim 44 wherein the code for identifying the first set of comparison techniques from the plurality of comparison techniques comprises:

code for using the first information to determine if a comparison technique from the plurality of comparison techniques is included in the first set of comparison techniques.

46. The computer program product of claim 43 further comprising:

code for receiving information identifying a time constraint; and code for identifying a second set of comparison techniques from the first set of comparison techniques that satisfy the time constraint;

wherein the code for comparing the contents of the input image and the contents of the images in the first set of images using the one or more comparison techniques from the first set of comparison techniques comprises code for using comparison techniques included in the second set of comparison techniques.

47. The computer program product of claim 43 wherein the code for comparing the contents of the input image and the contents of images in the first set of images using one or more comparison techniques from the first set of comparison techniques comprises:

code for determining an order in which comparison techniques in the first set of comparison techniques are to be applied; and code for applying the one or more comparison techniques from the first set of comparison techniques in the determined order.

48. The computer program product of claim 43 wherein the code for determining if the first set of images includes an image comprising contents that match the presentation information in the region of interest of the input image comprises:

code for receiving, for each comparison technique in the one or more techniques from the first set of comparison techniques, a confidence score for the comparison technique and a matching image identified by the comparison technique from the first set of images as containing contents that match the presentation information in the region of interest of the input image; and code for identifying, based upon the confidence scores for the one or more comparison techniques, an image, from the matching images identified by the one or more comparison techniques, as the image comprising contents that match the presentation information in the region of interest of the input image.

49. The computer program product of claim 48 wherein the image from the matching images identified as comprising contents that match the presentation information in the region of interest of the input image is a matching image identified by a comparison technique with the highest confidence score.

50. The computer program product of claim 43 wherein the code for determining if the first set of images includes an image comprising contents that match the presentation information in the region of interest of the input image comprises:

code for receiving, for each comparison technique in the one or more techniques from the first set of comparison techniques, a confidence score for the comparison technique, a matching image identified by the comparison technique from the first set of images as containing contents that match the presentation information in the region of interest of the input image, and a distance value for each image in the first set of images, the distance value indicative of a measure of closeness of match between the presentation information contained in the region of interest of the input image and contents in the image from the first set of images; and code for identifying, based upon the confidence scores for the one or more comparison techniques and the distance values, an image, from the matching images identified by the one or more comparison techniques, as the image comprising contents that match the presentation information in the region of interest of the input image.

51. A computer program product stored on a computer-readable medium for determining if a plurality of images includes an image containing contents that match presentation information contained in a region of interest of an input image, the plurality of images including images captured by one or more types of capture devices, the computer program product comprising:

code for determining, for each image in the plurality of images, a type of capture device used to capture the image;

code for grouping the images in the plurality of images into a plurality of sets based upon the types of capture devices used to capture the images such that all images captured by a type of capture device are grouped in one set;

for each set in the plurality of sets of images,
code for determining if the input image and images in the set have a first characteristic,
code for determining if the input image and the images in the set have a second characteristic,
code for identifying a set of comparison techniques from a plurality of comparison techniques based upon whether or not the input image and the images in the set have the first characteristic and the second characteristic,
code for comparing contents of the input image and contents of the images in the set using one or more comparison techniques from the set of comparison techniques, code for receiving, for each comparison technique in the one or more comparison techniques, a confidence score for the comparison technique and a matching image identified by the comparison technique from the set of images as containing contents that match the presentation information in the region of interest of the input image, code for determining a set confidence score for the set based upon the confidence scores for the one or more comparison techniques, and code for determining, from the matching images identified by the one or more comparison techniques, a matching image identified by the comparison technique with the highest confidence score as a matching image for the set; and code for determining, based upon the set confidence scores for the plurality of sets, if the plurality of images includes an image comprising contents that match the presentation information in the region of interest of the input image.

52. The computer program product of claim 51 wherein the code for determining if the plurality of images includes an image comprising contents that match the presentation information in the region of interest of the input image comprises:

code for identifying the matching image for the set with the highest set confidence score as an image comprising contents that match the presentation information in the region of interest of the input image.

53. The computer program product of claim 51 wherein:

the code for determining if the input image and images in the set have the first characteristic comprises code for determining if the input image and the images in the set are segmented; and the code for determining if the input image and the images in the set have a second characteristic comprises code for determining if the input image and the images in the set comprise text that can be recognized.

* * * * *